United States Patent
Oba

(10) Patent No.: US 10,122,601 B2
(45) Date of Patent: Nov. 6, 2018

(54) ELECTRONIC DEVICE AND METHOD OF CONTROLLING THE SAME

(71) Applicant: CANON KABUSHIKI KAISHA, Tokyo (JP)

(72) Inventor: Noboru Oba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 229 days.

(21) Appl. No.: 15/071,294

(22) Filed: Mar. 16, 2016

(65) Prior Publication Data

US 2016/0295436 A1   Oct. 6, 2016

(30) Foreign Application Priority Data

Apr. 3, 2015   (JP) .................................. 2015-077144

(51) Int. Cl.
| | | |
|---|---|---|
| *H04B 7/00* | (2006.01) | |
| *H04L 12/26* | (2006.01) | |
| *H04W 4/80* | (2018.01) | |

(52) U.S. Cl.
CPC ........ *H04L 43/065* (2013.01); *H04L 43/0817* (2013.01); *H04W 4/80* (2018.02)

(58) Field of Classification Search
CPC ... H04W 4/008; H04L 43/065; H04L 43/0817
USPC .................................. 455/41.2, 456.1, 404.2
See application file for complete search history.

(56) References Cited

U.S. PATENT DOCUMENTS

| | | | | |
|---|---|---|---|---|
| 8,938,810 B2* | 1/2015 | Richardson | ........... | H04W 12/12 726/27 |
| 2004/0014423 A1* | 1/2004 | Croome | .................. | H04L 63/08 455/41.2 |
| 2011/0269424 A1* | 11/2011 | Multer | ................ | H04L 67/1095 455/411 |
| 2014/0002239 A1* | 1/2014 | Rayner | ............. | G08B 13/1427 340/5.61 |

(Continued)

FOREIGN PATENT DOCUMENTS

| | | |
|---|---|---|
| CN | 101601197 A | 12/2009 |
| CN | 103197902 A | 7/2013 |

(Continued)

OTHER PUBLICATIONS

Office Action issued in Chinese Appln. No. 201610204297.2 dated Jul. 27, 2018. English translation provided.

*Primary Examiner* — April G Gonzales
(74) *Attorney, Agent, or Firm* — Rossi, Kimms & McDowell LLP

(57) ABSTRACT

To provide a technique for appropriately managing the log of a change of state of an electronic device, an electronic device including a wireless communication unit, detects, via the wireless communication unit, wireless communication from a terminal existing on the periphery of the electronic device; detects a change of state of the electronic device. The electronic device generates a first log that associates identification information corresponding to information included in the wireless communication with the detected change of state, generates a second log that associates identification information used to identify a user specified based on the login operation with the detected change of state, and stores the first log and the second log.

9 Claims, 22 Drawing Sheets

(56) References Cited

U.S. PATENT DOCUMENTS

| | | | | |
|---|---|---|---|---|
| 2014/0148196 A1* | 5/2014 | Bassan-Eskenazi | .... | G01S 11/02 |
| | | | | 455/456.1 |
| 2014/0240448 A1* | 8/2014 | Kanda | .................... | H04N 7/148 |
| | | | | 348/14.09 |
| 2015/0156605 A1* | 6/2015 | Skaaksrud | ............ | H04W 12/06 |
| | | | | 455/456.1 |
| 2016/0080892 A1* | 3/2016 | Basalamah | ........... | H04W 4/023 |
| | | | | 455/41.2 |

FOREIGN PATENT DOCUMENTS

| CN | 103647890 A | 3/2014 |
|---|---|---|
| JP | 2007320033 A | 12/2007 |

\* cited by examiner

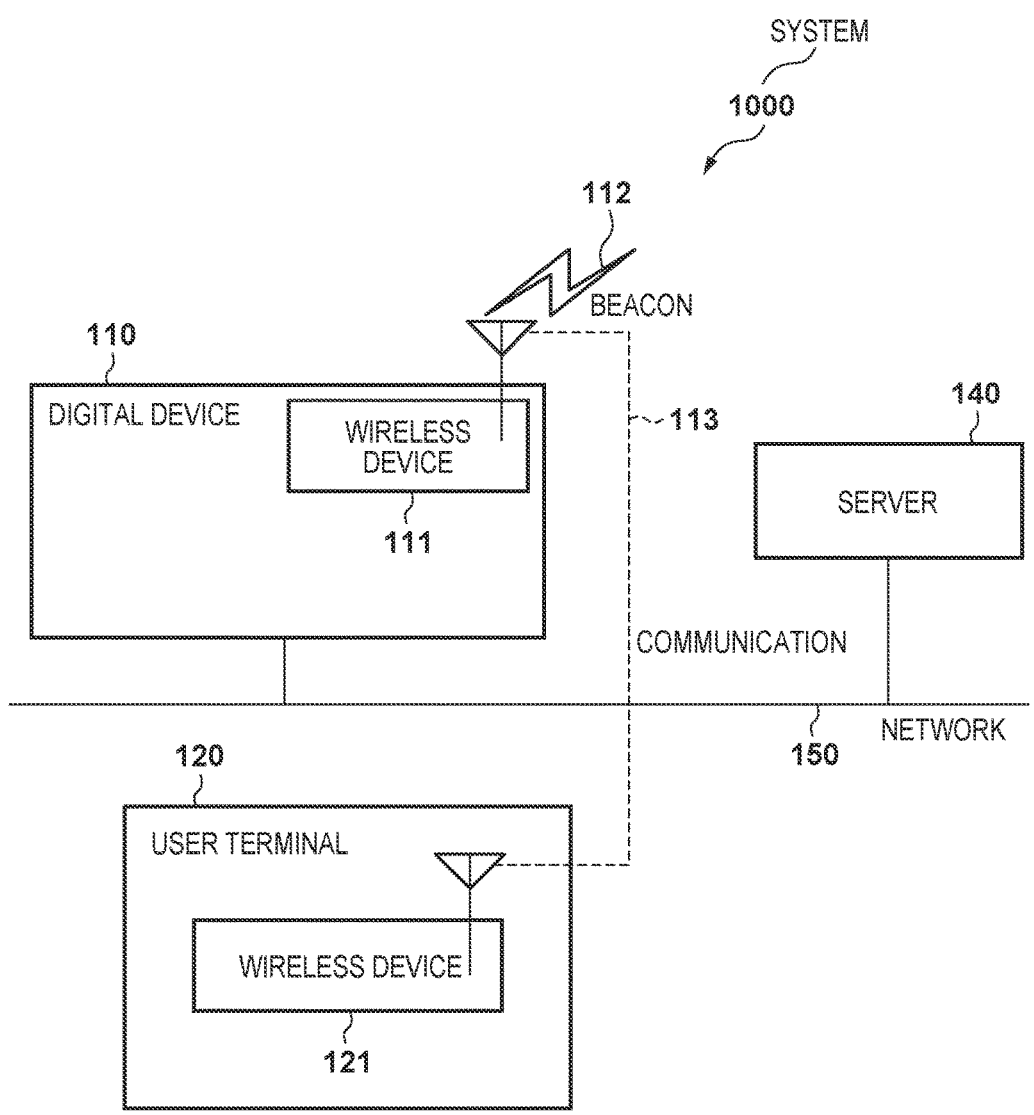

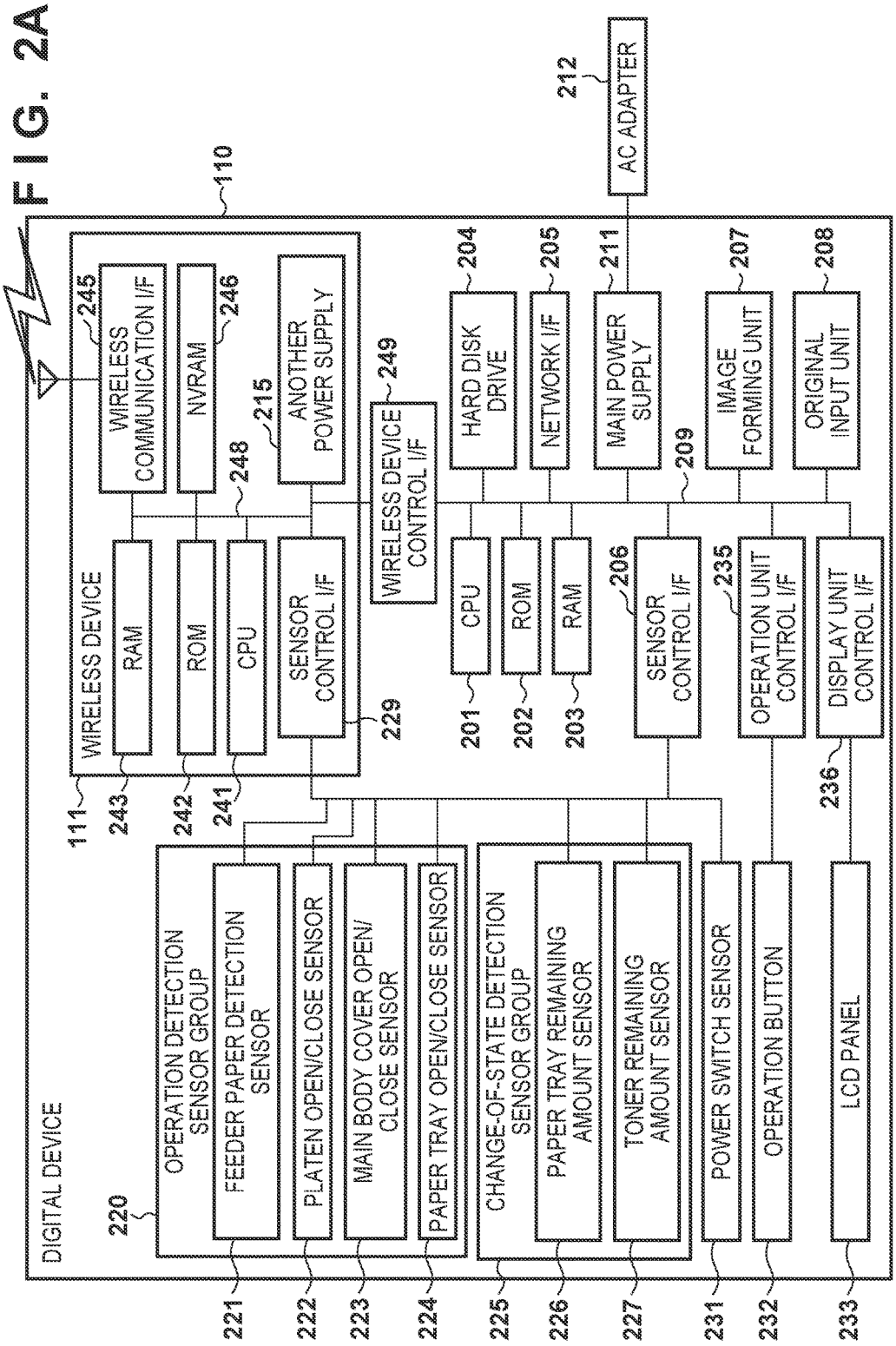

F I G. 4A

| DIGITAL DEVICE IDENTIFICATION INFORMATION | WIRELESS DEVICE IDENTIFICATION INFORMATION | SEARCH RANGE |
|---|---|---|
| DXXX1111 | WXXX1112 | Immediate |

F I G. 4B

| USER IDENTIFICATION INFORMATION | DISTANCE INFORMATION | WIRELESS DEVICE IDENTIFICATION INFORMATION | RECEPTION TIME |
|---|---|---|---|
| AAAAAAAA | Immediate | WXXX1112, WXXX1113 | 2014/12/16 17:16:26 |

F I G. 4C

| MAXIMUM DISTANCE BETWEEN OPERATION UNIT AND USER TERMINAL | NUMBER OF USERS WHO CAN SIMULTANEOUSLY EXIST IN OPERABLE RANGE |
|---|---|
| 80cm | 3 |

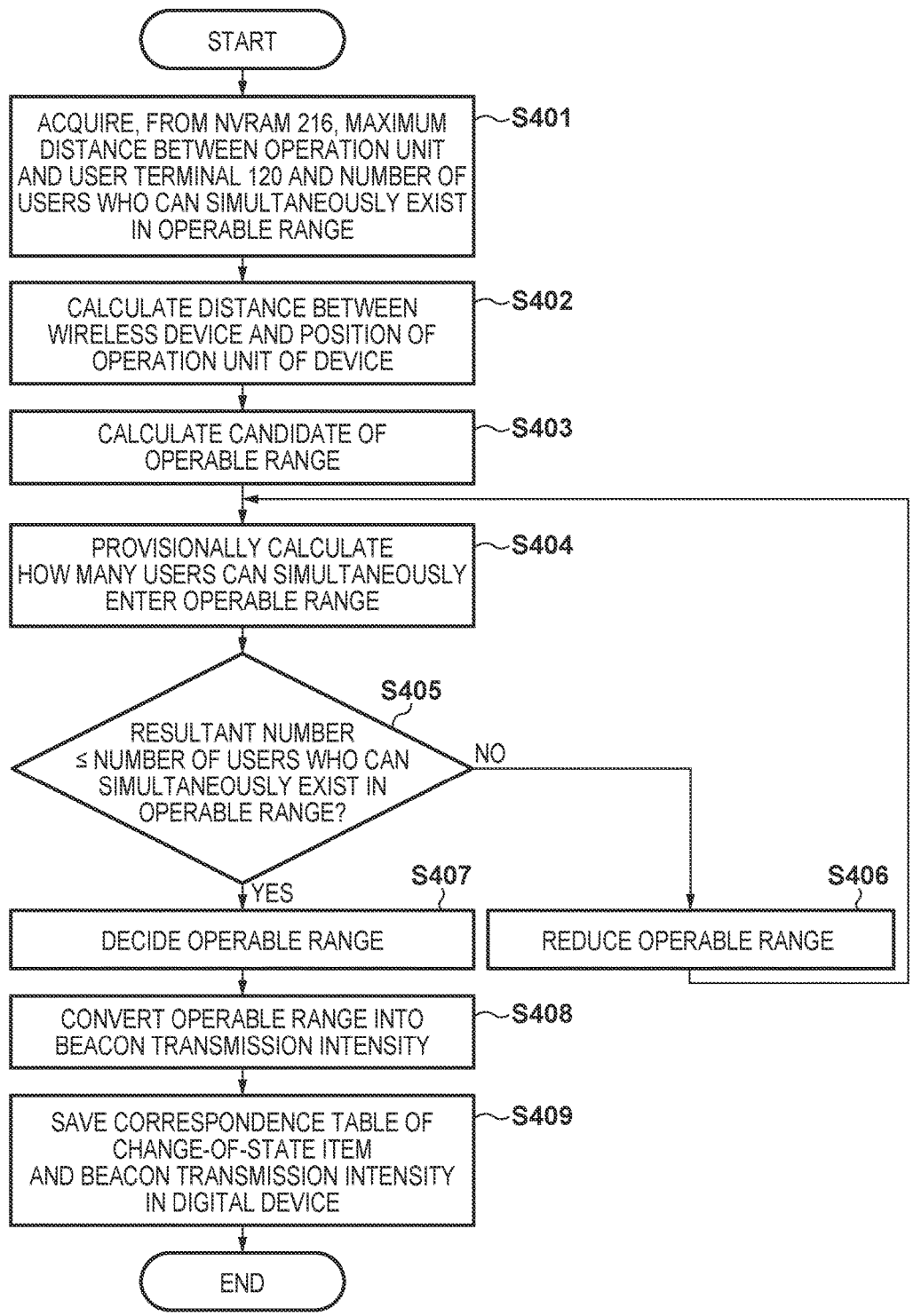

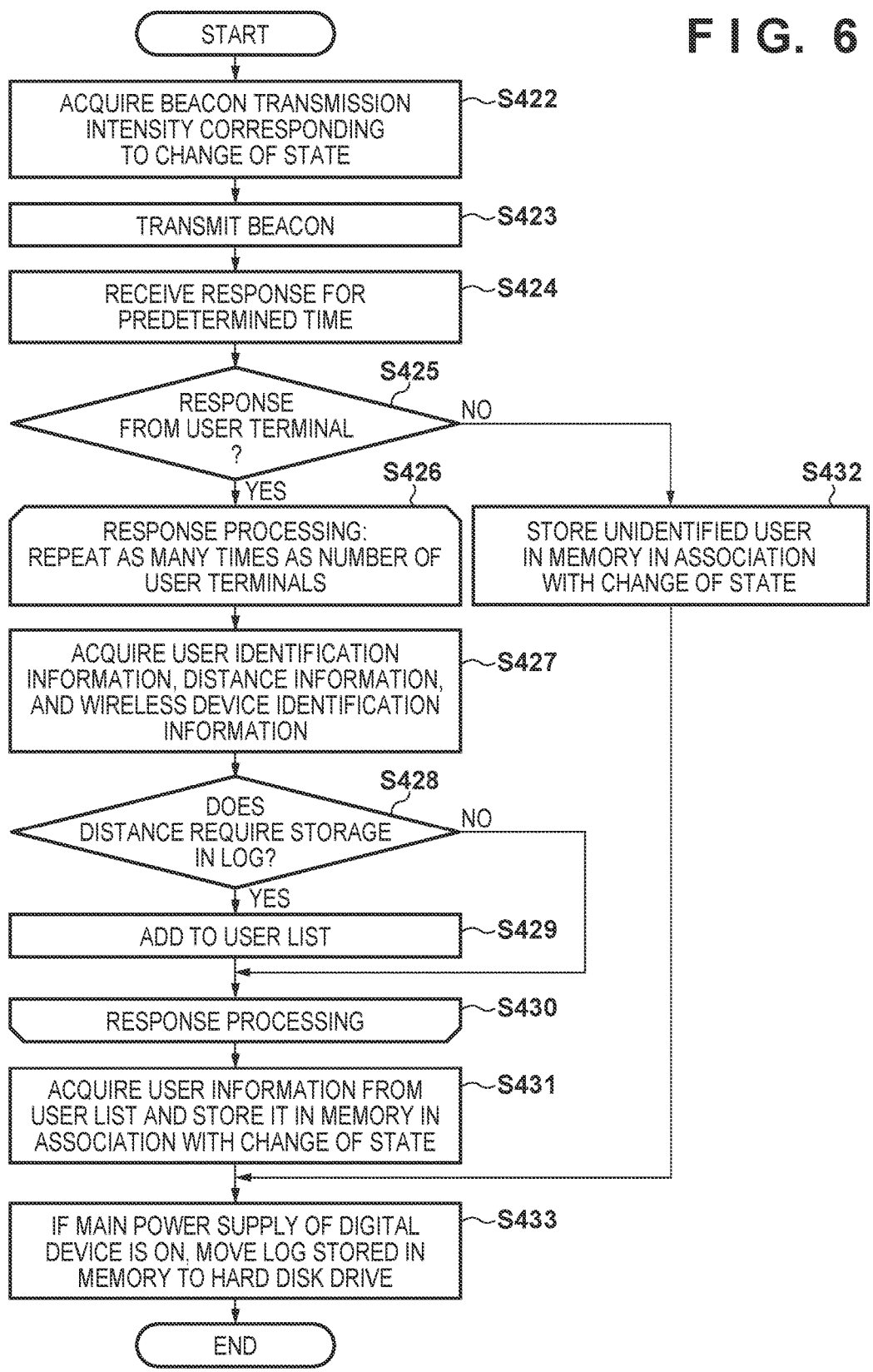

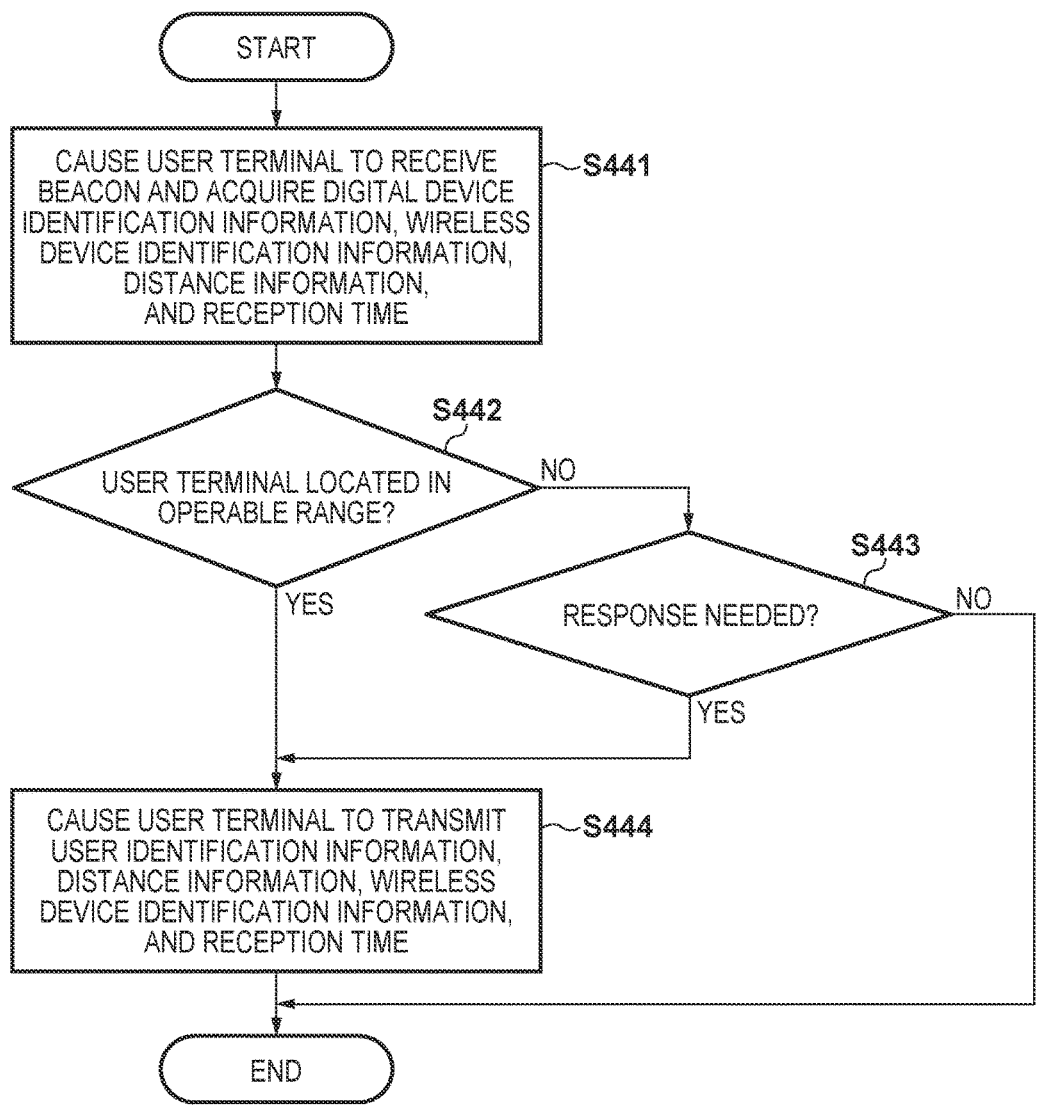

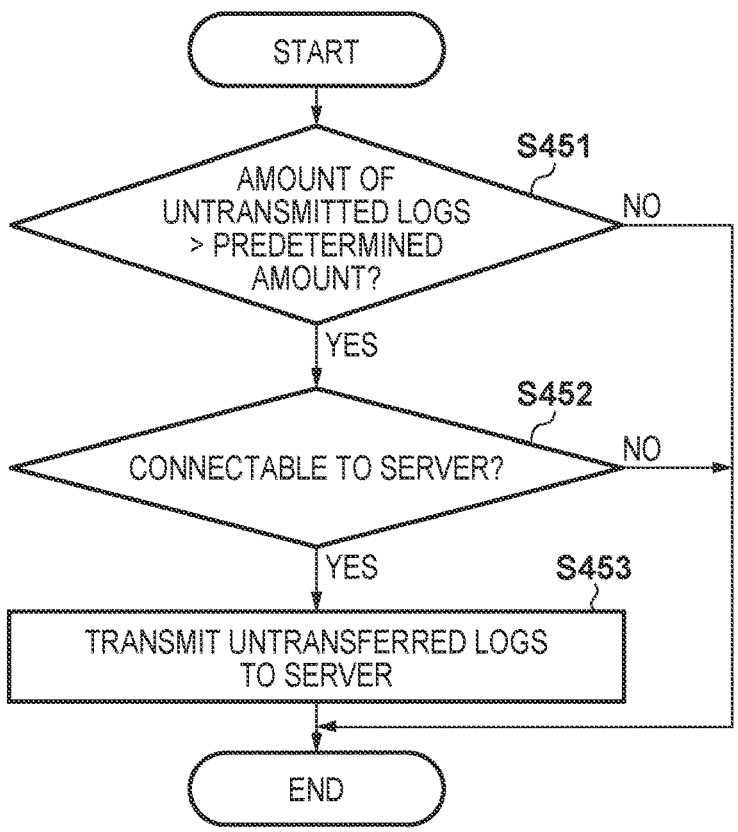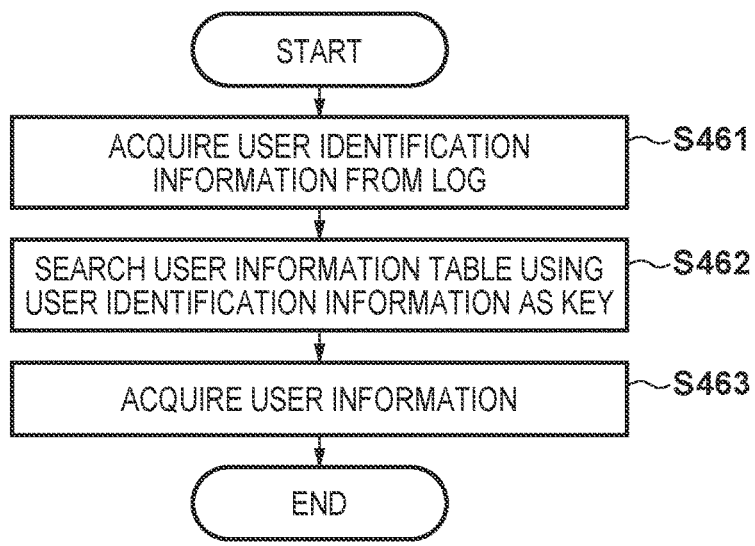

F I G. 12A

| CHANGE OF STATE | BEACON TRANSMISSION INTENSITY |
|---|---|
| MAIN BODY COVER OPEN | 2.5dBm |
| MAIN BODY COVER CLOSE | 2.5dBm |
| TONER DETACHMENT | 2.5dBm |
| TONER SET | 2.5dBm |
| PAPER TRAY OPEN | 3.5dBm |
| PAPER TRAY CLOSE | 3.5dBm |
| CHANGE IN REMAINING PAPER AMOUNT | 3.5dBm |
| CHANGE IN REMAINING TONER AMOUNT | 2.5dBm |

F I G. 12B

| CHANGE OF STATE | WIRELESS DEVICE A BEACON TRANSMISSION INTENSITY | WIRELESS DEVICE B BEACON TRANSMISSION INTENSITY | WIRELESS DEVICE C BEACON TRANSMISSION INTENSITY | COMBINATION CONDITION |
|---|---|---|---|---|
| MAIN BODY COVER OPEN | 2.5dBm | 0dBm | 0dBm | - |
| MAIN BODY COVER CLOSE | 2.5dBm | 0dBm | 0dBm | - |
| TONER DETACHMENT | 0dBm | 2.5dBm | 0dBm | - |
| TONER SET | 0dBm | 2.5dBm | 0dBm | - |
| PAPER TRAY OPEN | 0dBm | 0dBm | 2.5dBm | - |
| PAPER TRAY CLOSE | 0dBm | 0dBm | 2.5dBm | - |
| POWER SWITCH ON | 3.5dBm | 0dBm | 3.5dBm | WIRELESS DEVICE A & WIRELESS DEVICE C |
| POWER SWITCH OFF | 3.5dBm | 0dBm | 3.5dBm | WIRELESS DEVICE A & WIRELESS DEVICE C |
| CHANGE IN REMAINING PAPER AMOUNT | 0dBm | 0dBm | 3.0dBm | - |
| CHANGE IN REMAINING TONER AMOUNT | 0dBm | 2.5dBm | 0dBm | - |
| PAPER OUT ERROR | 0dBm | 0dBm | 2.5dBm | - |

FIG. 13

| CHANGE-OF-STATE ITEM | INTRA-OPERABLE RANGE USER | TIME |
|---|---|---|
| ADF ORIGINAL PLACEMENT | AAAAAAAA | 2014/1/15 13:00 |
| COPY BUTTON PRESS | AAAAAAAA | 2014/1/15 13:01 |
| DISCHARGE | AAAAAAAA | 2014/1/15 13:03 |
| COPY BUTTON PRESS | AAAAAAAA, BBBBBBBB | 2014/1/15 17:15 |
| FEEDER PAPER OUT ERROR | AAAAAAAA, BBBBBBBB | 2014/1/15 17:16 |
| ADF ORIGINAL PLACEMENT | AAAAAAAA, BBBBBBBB | 2014/1/15 17:20 |
| COPY BUTTON PRESS | AAAAAAAA, BBBBBBBB | 2014/1/15 17:21 |
| DECREASE IN REMAINING TONER AMOUNT | BBBBBBBB | 2014/1/15 17:25 |
| PAPER JAM ERROR | BBBBBBBB | 2014/1/15 17:28 |
| PAPER JAM SOLUTION | CCCCCCCC, BBBBBBBB | 2014/1/15 17:45 |
| DISCHARGE | BBBBBBBB | 2014/1/15 17:47 |
| POWER SWITCH OFF | CCCCCCCC | 2014/1/16 9:29 |
| COVER OPEN | CCCCCCCC | 2014/1/16 9:35 |
| TONER DETACHMENT | CCCCCCCC | 2014/1/16 9:40 |
| TONER ATTACHMENT | DDDDDDDD, CCCCCCCC | 2014/1/16 9:50 |
| COVER CLOSE | CCCCCCCC | 2014/1/16 9:52 |
| POWER SWITCH ON | CCCCCCCC | 2014/1/16 9:53 |
| COPY BUTTON PRESS | AAAAAAAA | 2014/1/16 10:15 |
| PAPER OUT ERROR | AAAAAAAA | 2014/1/16 10:20 |
| PAPER TRAY OPEN | AAAAAAAA | 2014/1/16 10:21 |
| PAPER TRAY CLOSE | AAAAAAAA | 2014/1/16 10:25 |
| INCREASE IN REMAINING PAPER AMOUNT | AAAAAAAA | 2014/1/16 10:26 |

F I G. 14

| CHANGE-OF-STATE ITEM | INTRA-OPERABLE RANGE USER | EXTRA-OPERABLE RANGE USER | TIME |
|---|---|---|---|
| ADF ORIGINAL PLACEMENT | AAAAAAAA | BBBBBBBB | 2014/1/15 13:00 |
| COPY BUTTON PRESS | AAAAAAAA | BBBBBBBB | 2014/1/15 13:01 |
| DISCHARGE | AAAAAAAA | BBBBBBBB | 2014/1/15 13:03 |
| COPY BUTTON PRESS | BBBBBBBB | | 2014/1/15 17:15 |
| FEEDER PAPER OUT ERROR | BBBBBBBB | | 2014/1/15 17:16 |
| ADF ORIGINAL PLACEMENT | BBBBBBBB | | 2014/1/15 17:20 |
| COPY BUTTON PRESS | BBBBBBBB | CCCCCCCC | 2014/1/15 17:21 |
| DECREASE IN REMAINING TONER AMOUNT | BBBBBBBB | CCCCCCCC | 2014/1/15 17:25 |
| PAPER JAM ERROR | BBBBBBBB | CCCCCCCC | 2014/1/15 17:28 |
| PAPER JAM SOLUTION | CCCCCCCC, BBBBBBBB | | 2014/1/15 17:45 |
| DISCHARGE | BBBBBBBB | | 2014/1/15 17:47 |
| POWER SWITCH OFF | CCCCCCCC | DDDDDDDD | 2014/1/16 9:29 |
| COVER OPEN | CCCCCCCC | DDDDDDDD | 2014/1/16 9:35 |
| TONER DETACHMENT | CCCCCCCC | DDDDDDDD | 2014/1/16 9:40 |
| TONER ATTACHMENT | DDDDDDDD, CCCCCCCC | | 2014/1/16 9:50 |
| COVER CLOSE | CCCCCCCC | DDDDDDDD | 2014/1/16 9:52 |
| POWER SWITCH ON | CCCCCCCC | DDDDDDDD | 2014/1/16 9:53 |
| COPY BUTTON PRESS | AAAAAAAA | | 2014/1/16 10:15 |
| PAPER OUT ERROR | AAAAAAAA | | 2014/1/16 10:20 |
| PAPER TRAY OPEN | AAAAAAAA | | 2014/1/16 10:21 |
| PAPER TRAY CLOSE | AAAAAAAA | CCCCCCCC | 2014/1/16 10:25 |
| INCREASE IN REMAINING PAPER AMOUNT | AAAAAAAA | CCCCCCCC | 2014/1/16 10:26 |

| USER IDENTIFICATION INFORMATION | NAME | MAIL ADDRESS | SECTION |
|---|---|---|---|
| AAAAAAAA | YAMADA TARO | aaa@xxx.net | FIRST SALES DEPARTMENT |
| BBBBBBBB | KIMURA HANAKO | bbb@xxx.net | FIRST SALES DEPARTMENT |
| CCCCCCCC | SUZUKI KOJIRO | ccc@xxx.net | SECOND ENGINEERING DEPARTMENT |
| DDDDDDDD | MURATA SABURO | ddd@xxx.net | ADMINISTRATIVE DEPARTMENT |

F I G. 18
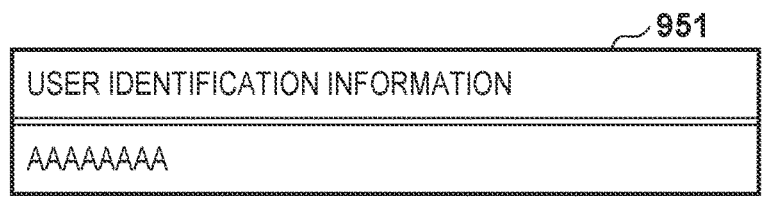

F I G. 21A

| CHANGE OF STATE | BEACON MINIMUM RECEPTION INTENSITY |
|---|---|
| MAIN BODY COVER OPEN | 1.0dBm |
| MAIN BODY COVER CLOSE | 1.0dBm |
| TONER DETACHMENT | 1.2dBm |
| TONER SET | 1.2dBm |
| PAPER TRAY OPEN | 2.0dBm |
| PAPER TRAY CLOSE | 2.0dBm |
| CHANGE IN REMAINING PAPER AMOUNT | 2.0dBm |
| CHANGE IN REMAINING TONER AMOUNT | 1.2dBm |

FIG. 21B

| CHANGE OF STATE | WIRELESS DEVICE A BEACON MINIMUM RECEPTION INTENSITY | WIRELESS DEVICE B BEACON MINIMUM RECEPTION INTENSITY | WIRELESS DEVICE C BEACON MINIMUM RECEPTION INTENSITY | COMBINATION CONDITION |
|---|---|---|---|---|
| MAIN BODY COVER OPEN | 1.0dBm | 0dBm | 0dBm | - |
| MAIN BODY COVER CLOSE | 1.0dBm | 0dBm | 0dBm | - |
| TONER DETACHMENT | 0dBm | 0.5dBm | 0dBm | - |
| TONER SET | 0dBm | 0.5dBm | 0dBm | - |
| PAPER TRAY OPEN | 0dBm | 0dBm | 1.5dBm | - |
| PAPER TRAY CLOSE | 0dBm | 0dBm | 1.5dBm | - |
| POWER SWITCH ON | 1.3dBm | 0dBm | 1.3dBm | WIRELESS DEVICE A & WIRELESS DEVICE C |
| POWER SWITCH OFF | 1.3dBm | 0dBm | 1.3dBm | WIRELESS DEVICE A & WIRELESS DEVICE C |
| CHANGE IN REMAINING PAPER AMOUNT | 0dBm | 0dBm | 1.5dBm | - |
| CHANGE IN REMAINING TONER AMOUNT | 0dBm | 0.5dBm | 0dBm | - |
| PAPER OUT ERROR | 0dBm | 0dBm | 1.5dBm | - |

ELECTRONIC DEVICE AND METHOD OF CONTROLLING THE SAME

BACKGROUND OF THE INVENTION

Field of the Invention

The present invention relates to a technique of managing the log of a change of state of an electronic device.

Description of the Related Art

There is widely used, among digital devices, a function of acquiring the operation item of a certain operation performed for a digital device and a user who performed the operation in association with each other as a log. For example, a multi-function printer (MFP) identifies a user by login using an IC card or the like, and acquires a log by associating the user with the items of an operation, a change of state, and the like and time information.

A log obtained in this way can be used for system management in a user company. Even if a failure has occurred in a digital device, an associated user can be specified. In addition, a log is transmitted to a cloud and analyzed using a data mining technology. For example, the use state of a user, the maintenance state, and the like are analyzed and used as information to reduce cost in a user company, or provided to a maker and used as information for maintenance prediction and fault prediction or development/ improvement of a digital device.

On the other hand, a system that identifies a user using a radio frequency tag has also been devised. For example, Japanese Patent Laid-Open No. 2007-320033 proposes a communication robot that detects a radio frequency tag on the periphery. More specifically, there is disclosed a technique of causing a robot to identify each user based on a detected radio frequency tag, managing an action history in association with a user, and deciding an action for each user based on the history.

To acquire a log by associating a change of state of a digital device caused by an operation for an outer portion (cover opening/closing, part replacement operation, or the like) of the digital device, the user needs to be identified. However, if a user performs an operation for the digital device without a login operation, the digital device cannot internally identify the user. Examples of an operation executable without a login operation to an MFP are opening/ closing of a paper tray, opening/closing of a main body cover, and toner exchange.

When an operation for a digital device is performed, it is possible to detect a terminal (a radio frequency tag or the like) held by a user and store the detection result as a log in association with the operation. In this case, however, a user who is irrelevant to the operation may erroneously be associated.

SUMMARY OF THE INVENTION

According to one aspect of the present invention, an electronic device including a wireless communication unit, comprises: a detection unit configured to detect, via the wireless communication unit, wireless communication from a terminal existing on the periphery of the electronic device; a state detection unit configured to detect a change of state of the electronic device; a first log generation unit configured to, if the state detection unit detects the change of state, and the detection unit detects wireless communication that meets a predetermined condition, generate a first log that associates identification information corresponding to information included in the wireless communication with the detected change of state; a second log generation unit configured to, if the state detection unit detects the change of state after a login operation to the electronic device is performed, generate a second log that associates identification information used to identify a user specified based on the login operation with the detected change of state; and a log storage unit configured to store the first log and the second log.

The present invention more appropriately manages the log of a change of state in an electronic device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the overall arrangement of a system according to the first embodiment;

FIG. 2A is a block diagram showing the hardware arrangement of a digital device;

FIGS. 4A to 4C are views showing the structures of various kinds of data;

FIG. 5 is a flowchart showing initialization processing of the digital device;

FIG. 6 is a flowchart showing log output processing of the digital device;

FIG. 7 is a flowchart showing processing of the user terminal at the time of beacon reception;

FIG. 8 is a flowchart showing log transmission processing of the digital device;

FIG. 9 is a flowchart showing processing of the server;

FIGS. 12A and 12B are views showing tables each of which associates changes of states with beacon transmission intensities;

FIG. 13 is a view showing an example of an output log;

FIG. 14 is a view showing another example of an output log;

FIG. 18 is a view showing the structure of data;

FIGS. 21A and 21B are views showing tables each of which associates changes of states with beacon minimum reception intensities.

DESCRIPTION OF THE EMBODIMENTS

Figure 2B:
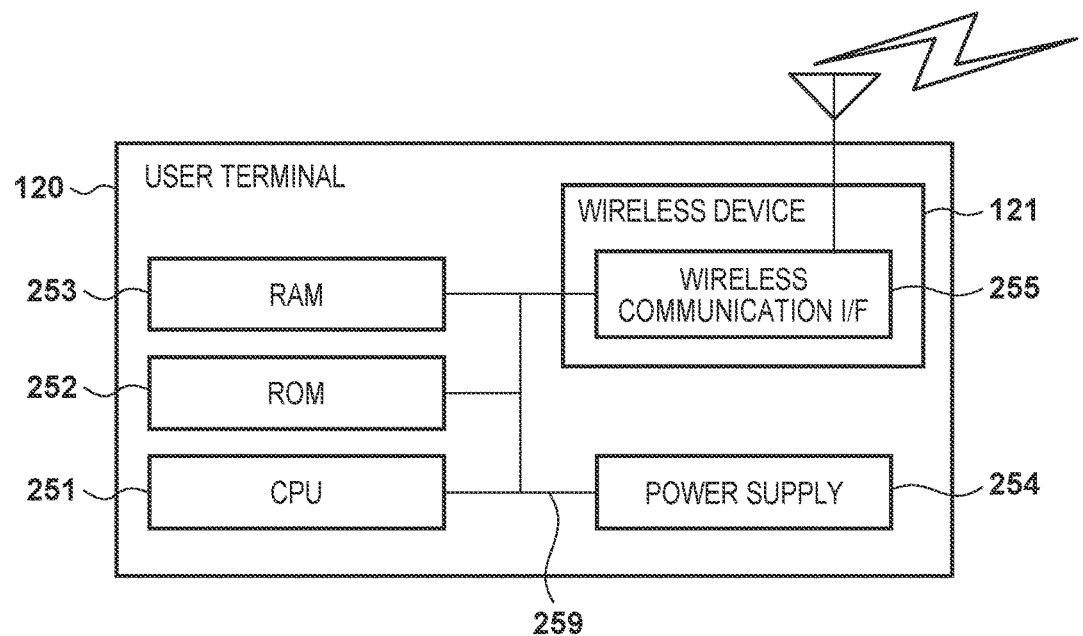
FIG. 2B is a block diagram showing the hardware arrangement of a user terminal.

Preferred embodiments of the present invention will now be described in detail with reference to the accompanying drawings. Note that the following embodiments are merely examples, and the technical scope of the present invention is not limited by the embodiments.

First Embodiment

A digital device 110 will be exemplified below as an electronic device according to the first embodiment of the present invention.

<System Arrangement and Arrangement of Each Device>

FIG. 1 is a block diagram showing the overall arrangement of a system 1000 according to the first embodiment. The system 1000 includes the digital device 110 that is an electronic device. The system 1000 includes the digital device 110, a user terminal 120, and a server 140 for data collection/analysis, which are communicably connected to each other via a network 150.

The digital device 110 includes a wireless device 111 that is a wireless communication unit. The wireless device 111 has a function of broadcasting a radio signal (beacon) including the information of the digital device 110 on the transmission side and transmitting the contents to wireless devices of the same standard existing in the neighborhood. A beacon 112 represents a beacon transmitted from the wireless device 111.

The user terminal 120 is a user device held by a user and includes a wireless device 121. The user terminal 120 can be, for example, a staff ID card or smartphone. Although FIG. 1 illustrates only one user terminal 120, a plurality of user terminals may exist around the digital device 110, or the user terminal may be absent. The wireless device 121 receives the beacon 112 transmitted from the wireless device 111, operates a program, and performs communication 113 with the wireless device 111.

The server 140 has a function of analyzing data. More specifically, the server 140 collects logs acquired by the digital device 110 and transferred to the server 140, and analyzes the collected logs. Note that the server 140 can be placed in an arbitrary place on the network 150 or may be placed on a cloud via the Internet. The server 140 may include one server or a plurality of servers.

FIG. 2A is a block diagram showing the hardware arrangement of the digital device 110. Note that in the first embodiment, the digital device 110 is assumed to be a multi-function printer (MFP). However, the arrangement is not limited to this, and it can be any digital device including a wireless device or various kinds of sensors. For example, the embodiment can be applied to a digital device such as a robot or an ATM.

A central processing unit (CPU) 201 generally controls devices connected to a system bus 209 in accordance with programs stored in a ROM 202 that is a storage unit. A RAM 203 functions as the main memory or work area of the CPU 201. The ROM 202 stores various kinds of programs and data. A sensor control I/F 229 monitors various kinds of sensors associated with a change of state as a log acquisition target, and detects a change of state and receives data from the various kinds of sensors.

The various kinds of sensors are classified into an operation detection sensor group 220 configured to detect a change of state depending on a user operation for the digital device 110 and a change-of-state detection sensor group 225 configured to detect an autonomous change of state in the device such as an error occurrence or error recovery in the digital device 110.

The operation detection sensor group 220 includes, for example, a feeder paper detection sensor 221, a platen open/close sensor 222, a main body cover open/close sensor 223, and a paper tray open/close sensor 224 which are all connected to the sensor control I/F 229. The feeder paper detection sensor 221 is a sensor placed in a document feeder, and detects whether paper is set in the document feeder. The platen open/close sensor 222 can acquire the open/close state of the cover of the platen, and if the open/close state changes, transmits a signal to the sensor control I/F 229. The main body cover open/close sensor 223 can acquire the open/close state of the cover of a portion where toner or a paper conveyance device is placed, and if the open/close state changes, transmits a signal to the sensor control I/F 229. The paper tray open/close sensor 224 can acquire the open/close state of the tray for storing paper, and if the open/close state changes, transmits a signal to the sensor control I/F 229.

The change-of-state detection sensor group 225 includes, for example, a paper tray remaining amount sensor 226 and a toner remaining amount sensor 227 which are all connected to the sensor control I/F 229. The change-of-state detection sensor group 225 includes sensors capable of detecting an operation of the digital device 110, an error occurrence, a state concerning maintenance, and the timing of a change of state. The paper tray remaining amount sensor 226 detects the remaining amount of paper placed in the paper tray. The toner remaining amount sensor 227 detects the remaining toner amount in a toner cartridge. A power switch sensor 231 detects a change of state of a switch configured to turn on/off a main power supply 211 of the system 1000. When the user performs an operation of turning on/off the power switch, the power switch sensor 231 can detect it and send a signal to the sensor control I/F 229.

Note that the various kinds of sensors are not limited to these, and any arbitrary sensor capable of acquiring a change of state can be mounted depending on the type of the digital device 110. For example, if the digital device 110 is a vehicle, a door open/close sensor, a window open/close sensor, a seat sensor, a motion sensor, a weight sensor, and the like may be mounted.

The sensor control I/F 229 transmits a change of state detected by each of the various kinds of sensors to the wireless device 111. Triggered by this, the procedure of log acquisition is executed. The detected change of state is transmitted to not the CPU 201 but the wireless device 111 to enable log acquisition even in a case in which the main power supply 211 of the main body of the digital device 110 is OFF, and the CPU 201 is halting. Note that the sensor control I/F 229 and the various kinds of sensors are configured to use the main power supply 211 in a power-on state but be driven by switching the power supply to another power supply 215 in a power-off state. Note that when the main power supply is OFF, only minimum necessary sensors can be operated. When the main power supply is OFF, sensors corresponding to changes of states whose logs need not be acquired are powered off.

On the other hand, a sensor control I/F 206 monitors various kinds of sensors, like the sensor control I/F 229, but is connected to the system bus 209. When the main power supply is ON, pieces of information necessary for an operation as a normal MPF can be acquired from the various kinds of sensors using the sensor control I/F 206.

An LCD panel 233 is a device that directly displays the information of the digital device 110 to the user, and is connected to the system bus 209 via a display unit control I/F 236. Note that the LCD panel 233 is not limited to a device of a specific type as long as it is usable for information transmission to the user. For example, to transmit audio information to the user, a buzzer or a speaker may be mounted. In a vehicle, a speed meter and a fuel gauge can be mounted. Note that if information transmission to the user is unnecessary, the LCD panel 233 need not be mounted.

An operation button 232 includes at least one button to accept a user operation on the device. In the digital device 110 according to the first embodiment, the user operates the digital device 110 by operating the button. An operation on the operation button 232 is processed by the CPU 201 via an operation unit control I/F 235. To acquire the log of an operation on the operation button 232, the CPU 201 instructs a wireless device control I/F 249 to do log acquisition. Note that the operation button 232 may be implemented by a touch panel or the like. In, for example, a vehicle, a steering wheel, a lever, an accelerator pedal, a brake pedal, or the like is usable in place of the operation button 232. If unnecessary, the operation button 232 need not be mounted.

A hard disk drive (HDD) 204 is a storage unit connected to the system bus 209. Note that the storage unit is not limited to the HDD, and can be any device capable of permanently storing data. It may be a nonvolatile semiconductor memory. Alternatively, an interchangeable storage medium such as a CD-R may be connected via a reader/writer device.

A network I/F 205 is a connection I/F to the network 150, which enables connection to the network 150 and controls data transmission/reception. Note that communication with a portable telephone network may be controlled to connect to a network to a base station.

The wireless device 111 is a wireless device installed in the digital device 110 and corresponding to transmission of the beacon 112. The wireless device 111 communicates with the wireless device 121 of a terminal held by each user on the periphery. The wireless device 111 is here assumed to be incorporated in the digital device 110. However, the wireless device 111 may be attached outside the device via an interface such as a USB. The wireless device 111 may be implemented using the SoC (System on a Chip) technology.

The wireless device 111 includes, for example, a CPU 241, a RAM 243, a ROM 242, a wireless communication I/F 245, a NVRAM 246, and the sensor control I/F 229. In the first embodiment, the wireless device 111 includes, as a power supply, the other power supply 215 of a system separated from the main body of the digital device 110 is mounted. That is, even if the main power supply 211 of the digital device 110 is OFF, or an AC adapter 212 is disconnected from a socket, the wireless device 111 can operate. The other power supply 215 may be independent like a battery or may be charged from the main power supply system of the main body of the digital device 110 via a charger. Note that if log acquisition is unnecessary in the OFF sate of the main power supply 211 of the digital device 110, only the main power supply 211 may be used without providing the other power supply 215.

The CPU 241 of the wireless device 111 generally controls devices on the wireless device 111 which are connected to a system bus 248 by executing programs stored in the ROM 242 that is a storage unit. The RAM 243 functions as the main memory or work area of the CPU 241. If the main power supply of the digital device 110 is OFF, the RAM 243 also functions as an area to temporarily hold log information. The ROM 242 stores various kinds of programs and data. The wireless device 111 communicates with the main body of the digital device 110 via the wireless device control I/F 249.

An image forming unit 207 is a module configured to perform printing as a normal MFP function. An original input unit 208 is a module configured to read an original when performing scan or copy as a normal MFP function.

FIG. 2B is a block diagram showing the hardware arrangement of the user terminal 120. A CPU 251 generally controls devices connected to a system bus 259 in accordance with programs stored in a ROM 252 that is a storage unit. A RAM 253 functions as the main memory or work area of the CPU 251. The ROM 252 stores various kinds of programs and data. A power supply 254 can be a battery or a rechargeable battery. A wireless communication I/F 255 is a wireless device corresponding to reception of the beacon 112.

Figure 2C:
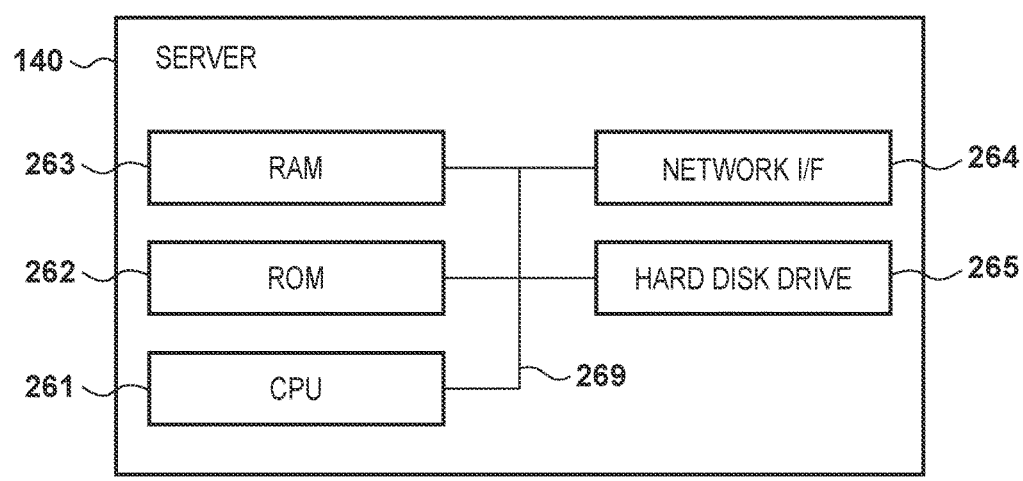
FIG. 2C is a block diagram showing the hardware arrangement of a server.

FIG. 2C is a block diagram showing the hardware arrangement of the server. A CPU 261 generally controls devices connected to a system bus 269 in accordance with programs stored in a ROM 262 that is a storage unit. A RAM 263 functions not only as an area to load a program code when the CPU 261 executes a program but also as the main memory or work area. The ROM 262 stores various kinds of programs and data. A network I/F 264 is a connection I/F to the network 150, which enables connection to the network 150 and controls data transmission/reception.

Figure 3:
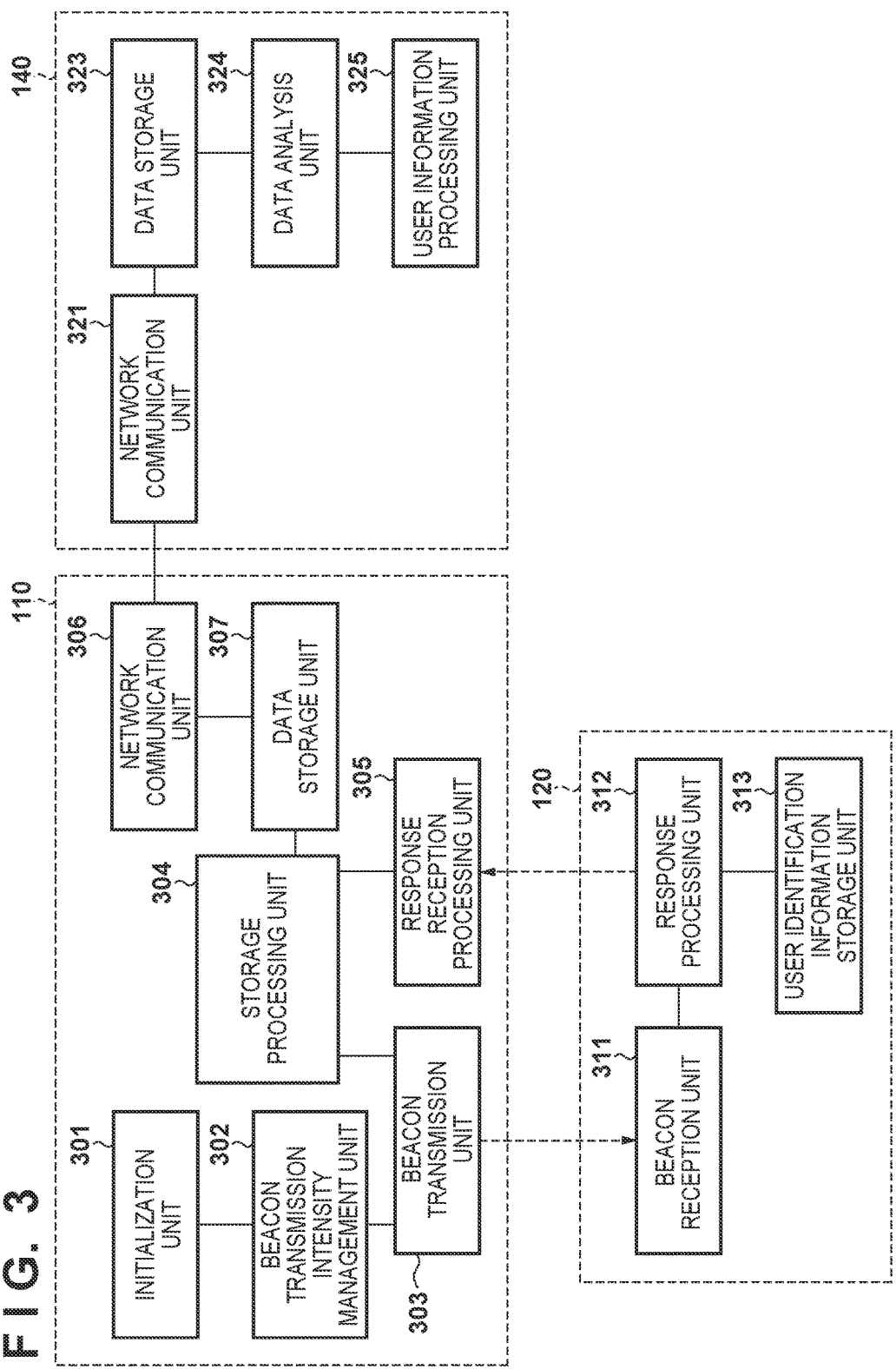
FIG. 3 is a block diagram showing the functional arrangements of the devices.

FIG. 3 is a block diagram showing the functional arrangements of the devices included in the system 1000. The programs that implement the functions are stored in the ROMs of the devices. The CPU of each device loads the programs to the ROM and executes them, thereby implementing these functions.

The digital device 110 includes an initialization unit 301, a beacon transmission intensity management unit 302, a beacon transmission unit 303, a storage processing unit 304, a response reception processing unit 305, a network communication unit 306, and a data storage unit 307. The initialization unit 301 decides an operable range 501, calculates the intensity of a signal to be transmitted from the wireless device 111, and transfers it to the beacon transmission intensity management unit 302. The beacon transmission intensity management unit 302 holds a beacon transmission intensity table in which an item of "change of state" is associated with "beacon transmission intensity".

FIGS. 12A and 12B are views showing tables each of which associates changes of states with beacon transmission intensities. FIG. 12A shows an example of a beacon transmission intensity table in a case in which a single wireless device 111 exists. This table includes a change 601 of state and a beacon transmission intensity 602. FIG. 12B shows an example of a beacon transmission intensity table in a case in which a plurality of wireless devices 111 exist. This table includes a change 611 of state, a wireless device A beacon transmission intensity 612, a wireless device B beacon transmission intensity 613, a wireless device C beacon transmission intensity 614, and a combination condition 615. Note that although an example in which three wireless devices A to C exist is illustrated here, the number of wireless devices may change.

The operation detection sensor group 220 or the change-of-state detection sensor group 225 detects a change of state of the digital device 110. Triggered by this, the storage processing unit 304 executes processing of acquiring a log.

The storage processing unit 304 is a functional unit that instructs the beacon transmission unit 303 to transmit the beacon 112 to acquire the user terminal 120 in the neighborhood. The beacon transmission unit 303 designates the item of a change of state, acquires, from the beacon transmission intensity management unit 302, a beacon transmission intensity to be transmitted from the wireless device 111, and transmits a beacon from the wireless device 111.

<Data Transmitted/Received Wirelessly>

FIGS. 4A to 4C are views exemplarily showing the structures of various kinds of data. FIG. 4A is a view exemplarily showing information included in the beacon 112 transmitted from the digital device 110. The beacon 112 includes digital device identification information 341, wireless device identification information 342, and a search range 343.

The digital device identification information 341 is information used to uniquely identify the digital device. The wireless device 111 provided in the digital device 110 can be specified from the digital device identification information 341. The wireless device identification information 342 is information used to identify each wireless device 111 when there exist a plurality of wireless devices 111. If a single wireless device 111 exists, the wireless device identification information 342 may be absent.

The search range 343 is the information of a range to search for the user terminal 120. When the search range 343 is set to be wider than the operable range 501, the information of the user terminal 120 outside the operable range 501 can be acquired. Upon receiving the beacon 112, the user terminal 120 returns a response only when it is located inside the search range 343. However, the beacon 112 need not include the search range 343 in a case in which the search range 343 is always constant, for example, in a case in which the log acquisition target is set only inside the operable range 501. As the search range 343, a distance value or a beacon reception intensity may be designated, or an arbitrary character string representing the range may be used.

Note that in the following description, as a wireless technology for detecting a terminal existing on the periphery, wireless communication complying with BLE (Bluetooth Low Energy) capable of energy-saving communication in a relatively long distance (up to several m) is assumed to be used. In addition, as information to designate a range, distance information used in iBeacon® using BLE is assumed to be used. More specifically, three types of discrete distance levels, "Immediate" representing a distance of several cm to about 1 m, "Near" corresponding to a distance of 1 m to several m, and "Far" corresponding to a distance of several m or more, are used.

The response reception processing unit 305 detects wireless communication of a response from the user terminal 120 and receives it. The response reception processing unit 305 acquires user identification information 351 and distance information 352, and transfers them to the storage processing unit 304. The storage processing unit 304 associates the received user identification information 351 and distance information 352 with the item of a change of state, and saves them in the data storage unit 307 as a log. Note that the user identification information 351 includes at least one of the unique identification information of the user terminal, unique identification information corresponding to wireless communication of the user terminal, and identification information used to identify the user of the user terminal, which are specified without a login operation to the digital device 110.

<Examples of Log>

FIG. 13 is a view showing an example of an output log. In particular, FIG. 13 shows an example of a log storing user identification information for user terminals in the operable range 501. The log includes a change-of-state item 621 that is the item of a change of state of the digital device 110. The log also includes an intra-operable range user 622 that is the list of the user identification information 351 of user terminals that existed inside the operable range 501 when a change of state occurred. The log also includes a time 623 that is a time at which a change of state occurred. Note that in a case in which a plurality of wireless devices are used, as shown in FIG. 11B or 11C to be described later, the log may include data representing which wireless device detected each user terminal.

FIG. 14 is a view showing another example of an output log. In particular, FIG. 14 shows an example in which the user identification information of each user terminal outside the operable range 501 (within a detectable range) is stored together. Items other than an extra-operable range user 633 in FIG. 14 are the same as those in FIG. 13. The item 633 is "extra-operable range user" representing the user identification information 351 of user terminals that existed outside the operable range 501 out of detected user terminals. The user terminals are thus stored so as to be identifiable between the inside and the outside of the operable range 501.

Note that FIGS. 13 and 14 illustrate merely examples of logs, and an arbitrary format can be used as long as a change of state and user terminals within and outside the operable range are stored in association with each other. For example, a plurality of user terminals detected concerning the same change of state may be stored in different rows, or changes of states may be classified and stored in a plurality of tables.

When a predetermined number of logs are accumulated in the data storage unit 307, the network communication unit 306 transmits them to the server 140. The user terminal 120 includes a beacon reception unit 311, a response processing unit 312, and a user identification information storage unit 313. The beacon reception unit 311 receives the beacon 112 transmitted from the beacon transmission unit 303 of the digital device 110. In addition, the beacon reception unit 311 transfers the time at which the beacon 112 was received, the reception intensity of the beacon 112, and the digital device identification information 341 included in the beacon 112 to the response processing unit 312.

The response processing unit 312 acquires the user identification information 351 from the user identification information storage unit 313. In addition, the response processing unit 312 specifies the wireless device 111 of the response destination based on the digital device identification information 341, and transmits the user identification information 351, the time at which the beacon 112 was received, and the reception intensity of the beacon 112.

FIG. 4B shows information included in the response from the user terminal 120 to the digital device 110. The user identification information 351 is identification information unique to the user terminal 120 held by a user. The distance information 352 represents a distance acquired when the wireless device 121 receives a beacon, and has a value such as "Immediate", "Near", or "Far" when a technique such as BLE capable of acquiring a discrete value is used. If it is possible to acquire a continuous value, a numerical value may be designated. If only user terminals within the operable range 501 are targets, that is, if the search range 343 is not included in the beacon 112, the distance information 352 may be absent. If the distance information 352 is absent, the user terminal is considered to exist in the operable range.

Wireless device identification information 353 corresponds to the wireless device identification information 342 included in the beacon 112. When a plurality of beacons are received, a plurality of pieces of wireless device identification information are included. Note that if the digital device 110 includes only one wireless device 111, the wireless device identification information 353 may be absent.

The server 140 includes a network communication unit 321, a data storage unit 323, a data analysis unit 324, and a user information processing unit 325. The network communication unit 321 receives a log from the network communication unit 306 of the digital device 110, and saves it in the data storage unit 323.

The network communication unit 321 can communicate with a plurality of digital devices 110. In this case, log data may be saved for each digital device 110, or logs each including the digital device identification information 341 may be saved in one table.

The data analysis unit 324 analyzes a log saved in the data storage unit 323. The data analysis unit 324 transfers the user identification information 351 to the user information processing unit 325, thereby acquiring information such as the name and post of the user corresponding to the user identification information.

<Operations of Devices>

An initialization operation for detecting the user terminal 120 when a change of state is detected (an operation state is detected, or the state of a change of internal state is detected) in the digital device 110 will be described next. First, initial parameters used to decide the operable range 501 that is the range to search for the user terminal 120 when a change of state has occurred are set in an NVRAM 216 in advance. Hence, the operable range 501 and the initial parameter deciding method will be described.

The operable range 501 will be described first. The operable range 501 is a range to discriminate a user who can perform an operation. Note that the size of the operable range 501 can be changed by, for example, changing the beacon transmission intensity, as will be described later in detail.

Figure 10:
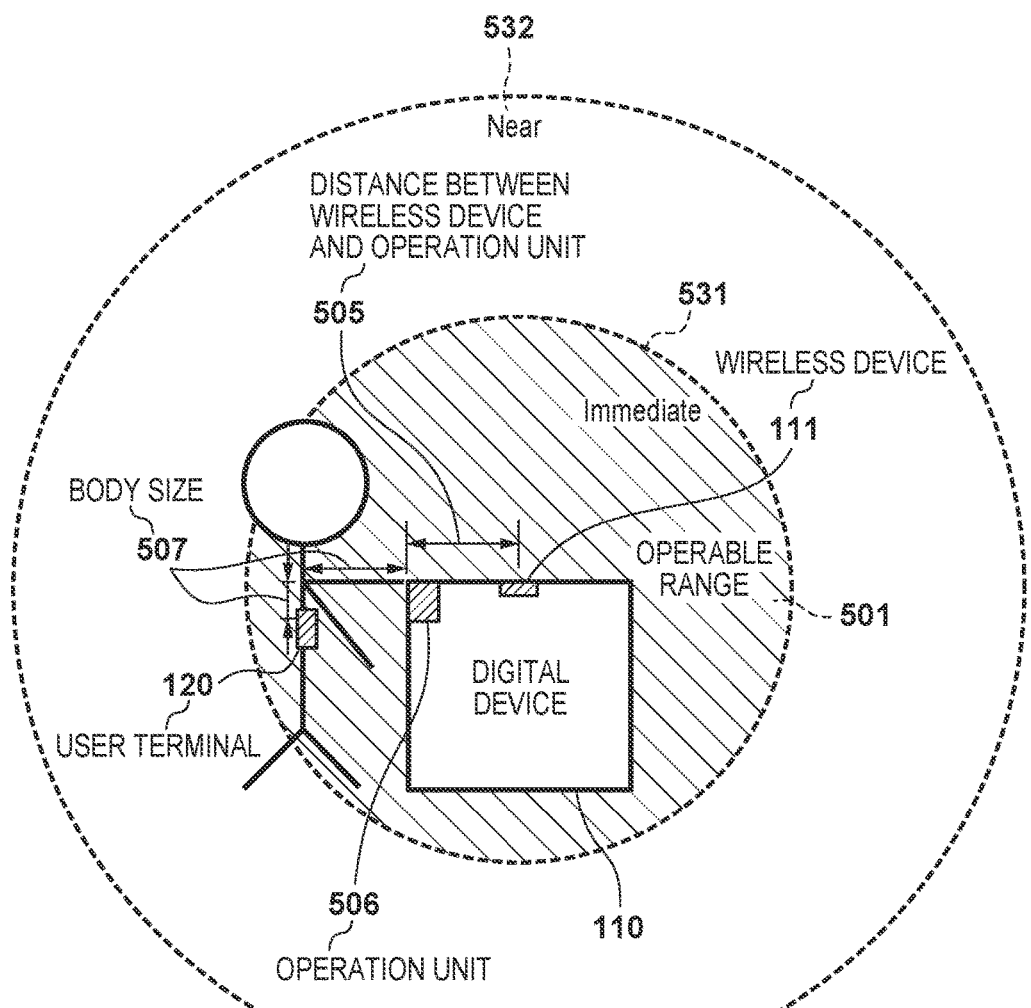
FIG. 10 is a view for explaining a beacon intensity and an operable range.
Figure 11A:
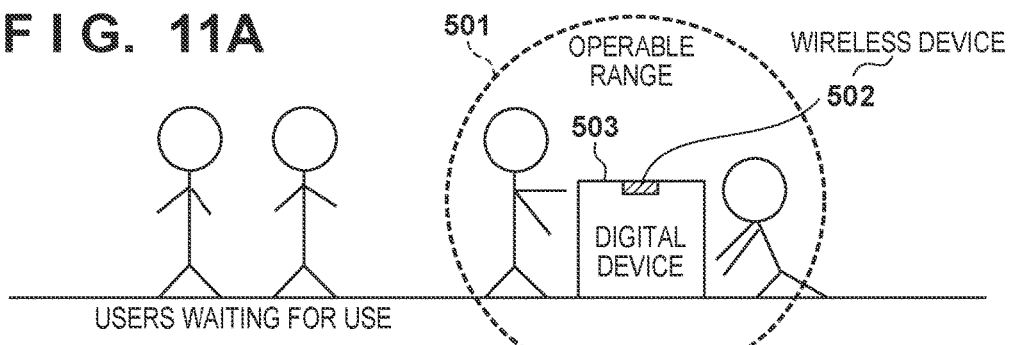
FIGS. 11A to 11C are views showing examples of the relationship between the operable range and user positions.
Figure 11B:
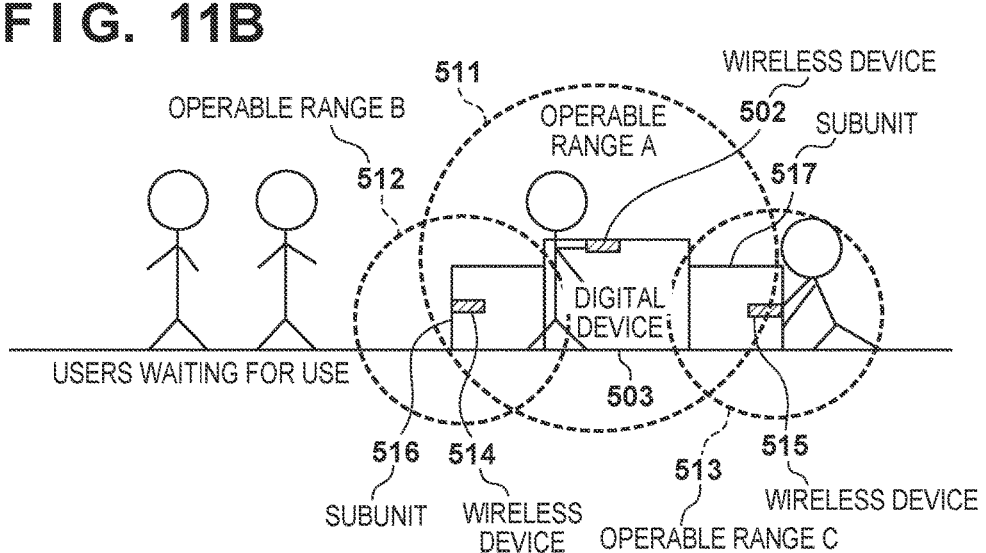
Figure 11C:
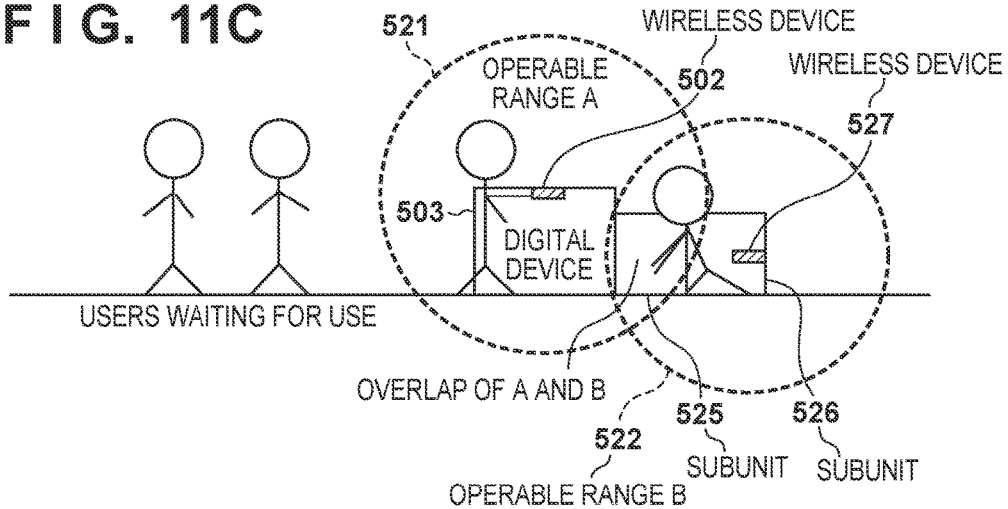

FIGS. 11A to 11C are views showing examples of the relationship between the operable range and user positions. FIG. 11A shows an example in which only one wireless device 111 exists. In this case, the operable range 501 is a spherical range with respect to the wireless device 111 as the center. The operable range 501 is preferably set to be sufficiently narrow so as not to detect the user terminal of a user waiting for use or a user who happens to exist in the neighborhood. Note that the relationship between a beacon intensity and the operable range will be described later with reference to FIG. 10.

The digital device 110 (digital device 503) includes at least one operation unit 506 and at least one wireless device 111 (wireless device 502). The operation unit 506 is a portion where the user performs an operation on the digital device 110. The operation unit 506 is, for example, a touch panel or a discharge tray for a printing result. The wireless device 111 transmits a beacon and is located at the center of the spherical operable range 501.

A distance 505 between the wireless device and an operation unit is the distance between the wireless device 111 and the operation unit 506 mounted on the digital device 110. The user terminal 120 is the same as described above. A body size 507 is the size of each body part of the user. An average value or a maximum value is used, although there is an individual difference. The distance from the operation unit to the user terminal held by the user can be decided based on the body size 507 of the user.

The body size of the user can be estimated based on the average value in a user group assumed as users and the magnitude of an individual difference. Normally, the individual difference can be considered as several tens of cm for an adult. The digital device 110 of a certain type is oriented to infants or children. However, the body size is different from that of an adult and is therefore calculated based on the individual difference and the average value in a group assumed to be users such as infants and children.

In addition, where the user holds the user terminal 120 is assumed. For example, if the user terminal 120 is a staff ID card, regulations often require a user to wear it using a neck strap when on duty. Based on these conditions, a maximum distance 361 between the operation unit and the user terminal when the user operates the operation unit of the digital device 110 is decided.

In addition, to obtain the operable range 501, the distance 505 between the wireless device and the operation unit is added. If there exists one wireless device 111, the maximum value of the operable range 501 can be obtained based on the two requirements. The position of the operation unit changes depending on the type of the operation.

For example, in an MFP, an operation button is located in the upper portion of the device, the paper tray is located in the lower portion of the device, and the discharge tray is located on a side surface of the device in many cases. If the size of the digital device 110 is large, or a subunit is attached, operation units exist in various places of the digital device 110 and the subunit.

If the operation unit is located far part from the wireless device 111, the operable range 501 needs to be set large. To cope with this, a different operable range 501 can be set by, for example, the items of an operation and a change of state. When the operable range 501 is set as narrow as possible, the user detection accuracy can be improved.

In addition, when the wireless device 111 is added to the digital device 110 or subunit, the detection accuracy can be raised. For example, a plurality of wireless devices 111 can be placed in the digital device 110 or subunit. Even in a case in which a plurality of wireless devices 111 are placed, a different operable range 501 can be set by an operation item.

In FIG. 11B, three wireless devices are placed in the digital device 110 and subunits 516 and 517, respectively. In this case, when searching for a user who has done an operation on the subunit 517, the position of the user can be specified at sufficient accuracy by using only a wireless device 515.

In FIG. 11C, the system includes the digital device 110 and subunits 525 and 526. However, the wireless devices 111 are placed only in the main body of the digital device 110 and the subunit 526. However, if a range where the search ranges of the wireless devices 502 and 527 overlap is set as the operable range of the operation unit of the subunit 525, the position of a user who exists near the operation unit of the subunit 525 can be specified at sufficient accuracy.

The operable range 501 other than the spherical operable range can also be set in the above-described way. For example, even for an article with a small depth and sufficient width and height such as a bookshelf in a library, when a lot of wireless devices 111 are placed, the position of a user can be specified at sufficient accuracy.

Note that in FIG. 11B, one wireless device is placed in correspondence with one unit. However, a plurality of wireless devices may be placed in one unit. When a plurality of wireless devices 111 are placed, the operable range 501 can be set in correspondence with an item of a change of state.

FIG. 4C is a view for explaining initial parameters set in the NVRAM 216 in advance.

As the maximum distance 361 between the operation unit and the user terminal 120, the maximum distance between the operation unit of the digital device 110 and the user terminal 120 held by a user who exists at an operable distance is set. This distance can be set in accordance with a body size, as already described. The maximum distance 361 between the operation unit and the user terminal 120 is decided and set in the NVRAM 216 in advance as an initial parameter.

The maximum distance 361 between the operation unit and the user terminal may be changed by the item of a change of state. In this case, a table in which the item of a change of state and the distance from the wireless device 111 are paired may be created and set in the NVRAM 216 as initial parameters. In addition, a predetermined number 362 of users who can simultaneously exist in the operable range of the digital device 110 is decided. If the range becomes large, many users can enter, and the possibility that a user who is irrelevant to the operation of the digital device 110 is detected rises. Hence, the accuracy of specifying a user can be raised by setting the range as narrow as possible.

As an exception, if a waiting area and an area to perform an operation are clearly distinguished, like ATM of a bank or a self-checkout unit in a store, a relatively large operable range 501 can be set. The operable range also depends on the application purpose of a log because the accuracy of log lowers if an irrelevant user is detected.

Based on these conditions, the number 362 of users who can simultaneously exist in the operable range is decided and set in the NVRAM 216 in advance as an initial parameter. Note that the predetermined number of users may be changed by the item of a change of state.

FIG. 5 is a flowchart showing initialization processing of the digital device 110. Processing of the initialization unit 301 is executed when the digital device 110 is placed and used for the first time. The processing is also automatically executed when a change such as subunit addition is done for the digital device 110. The processing may be executed automatically or based on a user instruction when, for example, the placement environment of the digital device 110 has changed.

Note that an administrator may manually create the beacon transmission intensity table and save it in the NVRAM 246 without performing the processing procedure of the initialization unit 301. The operable range 501 is not to be changed depending on a change-of-state item, a single beacon transmission intensity value may be saved in the NVRAM 246 without performing the processing procedure of the initialization unit 301. If the beacon transmission intensity value or the beacon transmission intensity table need not be changed, it may be saved in the ROM 242 or hardcoded as a fixed value.

In step S401, the initialization unit 301 acquires the maximum distance 361 between the operation unit and the user terminal 120 and the predetermined number 362 of users who can simultaneously exist in the operable range. As described above, these pieces of information are saved in the NVRAM 216 in advance.

In step S402, the initialization unit 301 calculates the distance between the wireless device 111 and the position of the operation unit of the device. When a plurality of wireless devices 111 are set, the nearest wireless device 111 is selected, and the distance from the wireless device 111 is calculated. If the distances from the plurality of wireless devices 111 almost equal, the distances from the plurality of wireless devices 111 are calculated.

In step S403, the initialization unit 301 decides a candidate of the operable range 501. For example, if the target includes one wireless device 111 in step S402, a spherical range having, as a radius, the sum of the maximum distance 361 between the operation unit and the user terminal 120 and the distance between the wireless device 111 and the position of the operation unit of the device is decided as the candidate of the operable range 501. If the target includes a plurality of wireless devices 111, an area where spherical ranges from the plurality of wireless devices 111 overlap is decided as the candidate of the operable range 501.

In step S404, the initialization unit 301 calculates the number of users who can simultaneously enter the candidate of the operable range 501. In step S405, the initialization unit 301 determines whether the number calculated in step S404 is smaller than the predetermined number 362 of users who can simultaneously exist in the operable range, which is acquired from the NVRAM 216 in step S401. If the determination result is true, the process advances to step S407. If the determination result is false, the process advances to step S406.

In step S406, the initialization unit 301 reduces the operable range 501, and returns to step S404. In step S407, the initialization unit 301 decides the candidate of the operable range 501 as the operable range 501.

In step S408, the initialization unit 301 calculates the transmission intensity of the beacon 112 corresponding to the operable range 501. A detailed method will be described later with reference to FIG. 10.

In step S409, the initialization unit 301 creates a beacon transmission intensity table in which change-of-state items and transmission intensities of the beacon 112 by the wireless device are summarized, and saves it in the NVRAM 246.

With this operation, the beacon transmission intensity table shown in FIG. 12A or 12B described above is stored in the NVRAM 246.

FIG. 10 is a view for explaining the relationship between a beacon intensity and the operable range. In particular, FIG. 10 shows the relationship between a discrete beacon intensity and the distance between the wireless device 111 and the user who operates the digital device 110. Note that the distance information acquirable by the user terminal 120 changes depending on the technique to use. Here, the distance is represented by a discrete distance level calculated from the intensity of the beacon 112.

Immediate 531 represents an area closest to the wireless device 111 that is the transmission source of the beacon 112 or a range of several cm to about 1 m. Near 532 represents the second closest area or a range of 1 m to several m. Since the actual ranges of Immediate 531 and Near 532 are calculated from the reception intensity of the beacon 112, the ranges of Immediate 531 and Near 532 are enlarged/reduced by changing the transmission intensity of the beacon 112.

As described above, the operable range 501 is set to, for example, several tens of cm in accordance with the body size. Hence, Immediate 531 is selected, and the transmission intensity of the beacon 112 is calculated such that the range matches the operable range 501 decided in step S407. This makes it possible to discriminate that the user terminal 120 exists inside the operable range 501 if the reception intensity of the beacon 112 received by the user terminal 120 is Immediate 531.

If a plurality of wireless devices 111 are placed, the intensity with which the wireless device 111 selected in step S402 should transmit the beacon 112 is calculated to make the operable range 501 match the range of Immediate. If a plurality of wireless devices 111 simultaneously transmit the beacons 112, a combination condition is designated to decide which wireless device should be detected.

When designating a range to simultaneously receive a plurality of beacons 112, for example, "wireless device A & wireless device B" is defined using an AND condition. If a plurality of beacons 112 are transmitted, but the beacon 112 of at least one wireless device needs to be received, for example, "wireless device A|wireless device B" is defined using an OR condition.

FIG. 6 is a flowchart showing log output processing of the digital device 110. If a change of state has occurred in the digital device 110, the digital device 110 detects the user terminal 120 existing on the periphery, acquires the user identification information 351, and generates and outputs a log.

Note that if the detected change of state needs a login operation of the user, the same log generation as usual is also performed. That is, a log in which the user specified based on the login operation is associated with the change of state is generated and output.

The operation detection sensor group 220 or the change-of-state detection sensor group 225 detects a change of state that has occurred in the digital device 110. Triggered by this, the digital device 110 executes log output processing. Note that if the operation detection sensor group 220 or the change-of-state detection sensor group 225 does not detect a change of state that has occurred in the digital device 110, the log output processing is not executed. For this reason, in this technique, it is unnecessary to always detect the position of the user terminal 120, and the power consumption can be small.

In step S422, the digital device 110 acquires a beacon transmission intensity corresponding to the change of state. If the beacon transmission intensity changes in the change of state, or one or more wireless devices 111 are placed on the digital device 110, the beacon transmission intensity of each wireless device is acquired from the beacon transmission intensity table saved in the NVRAM 246.

In step S423, the digital device 110 transmits the beacon 112 at the acquired intensity. As the information of the beacon 112, the digital device identification information 341 unique to the digital device 110 and the search range 343 are included. If a plurality of wireless devices 111 are placed, the wireless device identification information 342 is also included.

The search range 343 is information representing a range in which the user terminal 120 needs to respond, as described above. In the first embodiment, the search range 343 is not included in a case in which the log acquisition target is set only inside the operable range 501. The user terminal 120 on the periphery receives the beacon 112, and returns information including the user identification information 351 as needed.

In step S424, the digital device 110 receives the response from the user terminal 120 for a predetermined time, and acquires a reception time 354 from the response. The digital device 110 confirms based on the sufficient closeness to the transmission time that the response is the response to the beacon 112, and temporarily stores the information in the RAM 243.

In step S425, the digital device 110 determines whether a response from the user terminal 120 is received. For example, if the digital device 110 is operated, a response should be received from at least one user terminal 120. For this reason, if no response is received at all, the user who has done the operation is assumed to have no user terminal 120. Hence, in step S432, the unidentified user is temporarily stored in the RAM 243 in association with the change of state. If a response is received from at least one user terminal 120, the process enters a loop for each response in step S426.

In step S427, the digital device 110 acquires the user identification information 351 and the distance information 352 from the response. In step S428, the digital device 110 determines whether the distance information 352 indicates the inside of the operable range 501 or the inside of a range to store. If the distance information indicates the inside of the range, the user identification information 351 is added to the user list in step S429. Upon determining in step S428 that the distance information does not indicate the inside of the range, the process skips step S429.

In step S431, the digital device 110 stores the distance information 352 and the time in the RAM 243 in association with at least one piece of user identification information in the user list.

After processing all responses from the user terminals 120, in step S433, if the main power supply 211 of the digital device 110 is ON, the digital device 110 moves the log stored in the RAM 243 to the HDD 204.

Note that if the main power supply 211 of the digital device 110 is OFF, the process skips step S433, and the log is kept temporarily stored in the RAM 243. When this procedure is executed next, and the main power supply 211 of the digital device 110 is ON in step S433, logs temporarily stored in the RAM 243 are moved to the HDD 204 at once.

Examples of the log stored in the HDD 204 are shown in FIGS. 13 and 14 described above. FIG. 13 shows an example in which the log acquisition target is set only within the operable range (only inside the operable range 501). FIG. 14 shows an example in which the log acquisition target is set both within the operable range and outside the operable range (outside the operable range 501). User information is discriminately stored in accordance with the range.

The above-described log may be stored as log data different from a conventional log that associates a user specified based on a login operation with a change of state, or may be stored as a single log. When storing single log data, log storage is performed such that the base of the log can be identified. Note that if a log according to the procedure shown in FIG. 6 and a conventional log are generated concerning the same change of state, the two logs are associated and stored as one record. Alternatively, storage of the record of one of the two logs is inhibited.

FIG. 7 is a flowchart showing processing of the user terminal 120 at the time of beacon reception. That is, FIG. 7 shows a procedure performed when the user terminal 120 receives the beacon 112 from the digital device 110.

In step S441, upon receiving the beacon 112 from the digital device 110, the user terminal 120 acquires the distance information 352 and the reception time 354 of the beacon 112. The user terminal 120 also acquires the digital device identification information 341 unique to the digital device 110 and the search range 343, which are information included in the beacon 112. If the search range 343 is not included, the user terminal 120 responds only when it exists within the operable range 501.

The distance information 352 acquirable by the user terminal 120 changes depending on the technique to use. Here, a discrete distance level is acquired from the intensity of the beacon 112. That is, a value such as "Immediate" corresponding to the area closest to the beacon transmission source, "Near" corresponding to the second closest area, or "Far" corresponding to a far area is acquired. Here, the beacon intensity from the digital device 110 is adjusted so as to make the range of "Immediate" match the operable range 501. For this reason, if the beacon intensity corresponds to "Immediate", it indicates that the user terminal exists inside the operable range 501.

If a plurality of wireless devices 111 are mounted on the digital device 110, the contents of the beacons 112 transmitted from the wireless devices 111 include the same digital device identification information 341. Upon receiving a plurality of beacons 112 from the same device at the same timing, the wireless device identification information 353 that is information for identifying the wireless devices 111 of the beacon transmission sources and the distance information 352 corresponding to the beacons 112 are included in the response. Then, one wireless device 111 is decided from the digital device identification information 341, and one response is returned to the response destination.

In step S442, the user terminal 120 determines whether the position of its own is located within the operable range 501 of the wireless device 111. If the user terminal 120 exists inside the operable range 501, the process advances to step S444. On the other hand, if the user terminal 120 exists outside the operable range 501, the process advances to step S443.

In step S443, the user terminal 120 determines whether a response needs to be transmitted. In a case in which the search range 343 is included, the process advances to step S444 only when the user terminal exists inside the search range 343. Otherwise, the procedure ends without performing any process.

In step S444, the user terminal 120 transmits the user identification information 351 and the reception time 354 as a response. If the wireless device identification information 353 is included in the beacon 112, at least one piece of wireless device identification information 353 and distance information corresponding to it are transmitted as a response.

FIG. 8 is a flowchart showing log transmission processing of the digital device 110. That is, FIG. 8 shows a procedure performed when the digital device 110 transmits logs stored in the HDD 204 by the procedure shown in FIG. 6 described above to the server 140. For example, in a power-on state, the digital device 110 executes the procedure shown in FIG. 8 at a predetermined time interval.

In step S451, the digital device 110 determines whether the amount of logs has exceeded a predetermined amount. If the amount of logs has not reached the predetermined amount, the procedure ends. If the amount of logs has exceeded the predetermined amount, the process advances to step S452.

In step S452, if the digital device 110 is in a state in which communication with the server 140 is possible, the process advances to step S453. If the digital device 110 and the server 140 are not in a communicable state, the procedure ends.

In step S453, the digital device 110 transfers the log data to the server 140. The server 140 saves the received logs in a hard disk 265. The log data accumulated in the server 140 can be used for various kinds of data analysis.

FIG. 9 is a flowchart showing processing of the server 140. More specifically, FIG. 9 shows a procedure of acquiring user information by the server 140 when analyzing a log accumulated in the server 140.

In step S461, the server 140 acquires the user identification information 351 included in the log. In step S462, the server 140 searches the user information table shown in FIG. 15 using the user identification information 351 as a key. The user information table is a table that associates the user identification information 351 with information such as the name and post of a user. Note that the user information table can have an arbitrary format. In step S463, the server 140 acquires the information such as the name and post of the user corresponding to the user identification information 351.

As described above, according to the first embodiment, a log associated with a user can be acquired even for a change of state (for example, toner exchange, paper exchange, or error recovery) without a login operation to the digital device. Especially, when the position of a user relative to the digital device is specified using wireless communication, a more appropriate user concerning a change of state can be specified.

Note that an example in which BLE (in particular, discrete distance information in iBeacon) is used has been described above. However, any other wireless technology may be used as long as it is possible to identify a user and determine the position of the user.

In addition, when minimum necessary sensors and the wireless device 111 are operated by another power supply, an operation associated with a user can be stored in a log even when the main power supply is OFF.

Second Embodiment

In the second embodiment, a form in which a user terminal transmits a beacon, and the side of a digital device 110 receives the beacon will be described. That is, the beacon transmission/reception direction is reverse to that in the above-described first embodiment. A user terminal 120 is a device such as a security card that a user can carry with him/her, and periodically transmits a beacon 712. The beacon 712 includes user identification information as a minimum item.

<System Arrangement and Arrangement of Each Device>

Figures 15, 16:
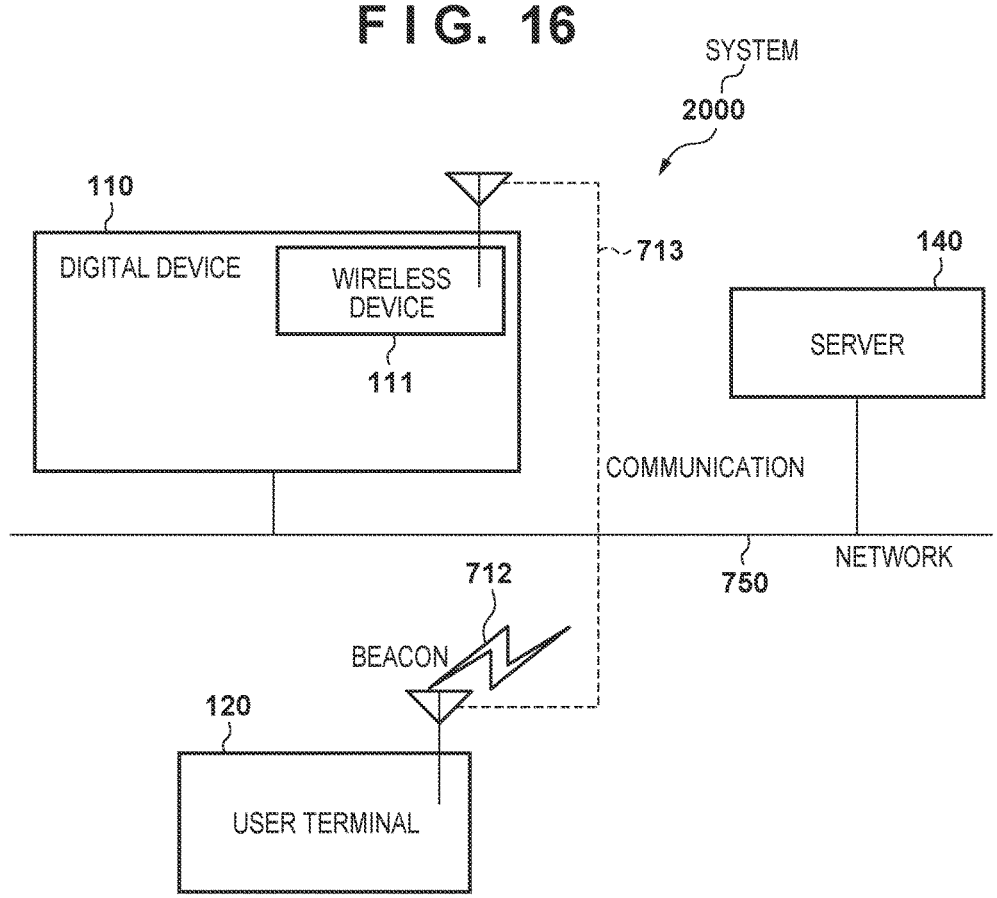
FIG. 15 is a view showing a user information table.
FIG. 16 is a block diagram showing the overall arrangement of a system according to the second embodiment.

FIG. 16 is a block diagram showing the overall arrangement of a system 2000 according to the second embodiment. The system 2000 includes the digital device 110. The digital device 110 includes a wireless device 111. The wireless device 111 has a function of receiving a beacon but need not always have a function of transmitting a beacon.

The system 2000 includes the user terminal 120. The user terminal 120 always transmits the beacon 712 including user identification information at a predetermined time interval. Additionally, in the system 2000, the digital device 110 includes the wireless device 111. The wireless device 111 receives the beacon 712 from the user terminal 120 existing on the periphery. The system 2000 is connected to a server 140 via a network 750. The server 140 is the same as in the first embodiment.

The hardware arrangement of each device/server included in the system 2000 will be described next. The hardware arrangement of the digital device 110 is the same as in the first embodiment. In the second embodiment, however, the wireless device 111 has a function of receiving the beacon 712, as described above. The hardware arrangement of the user terminal 120 is also the same as in the first embodiment. However, the wireless communication I/F has a function of transmitting the beacon 712.

Figure 17:
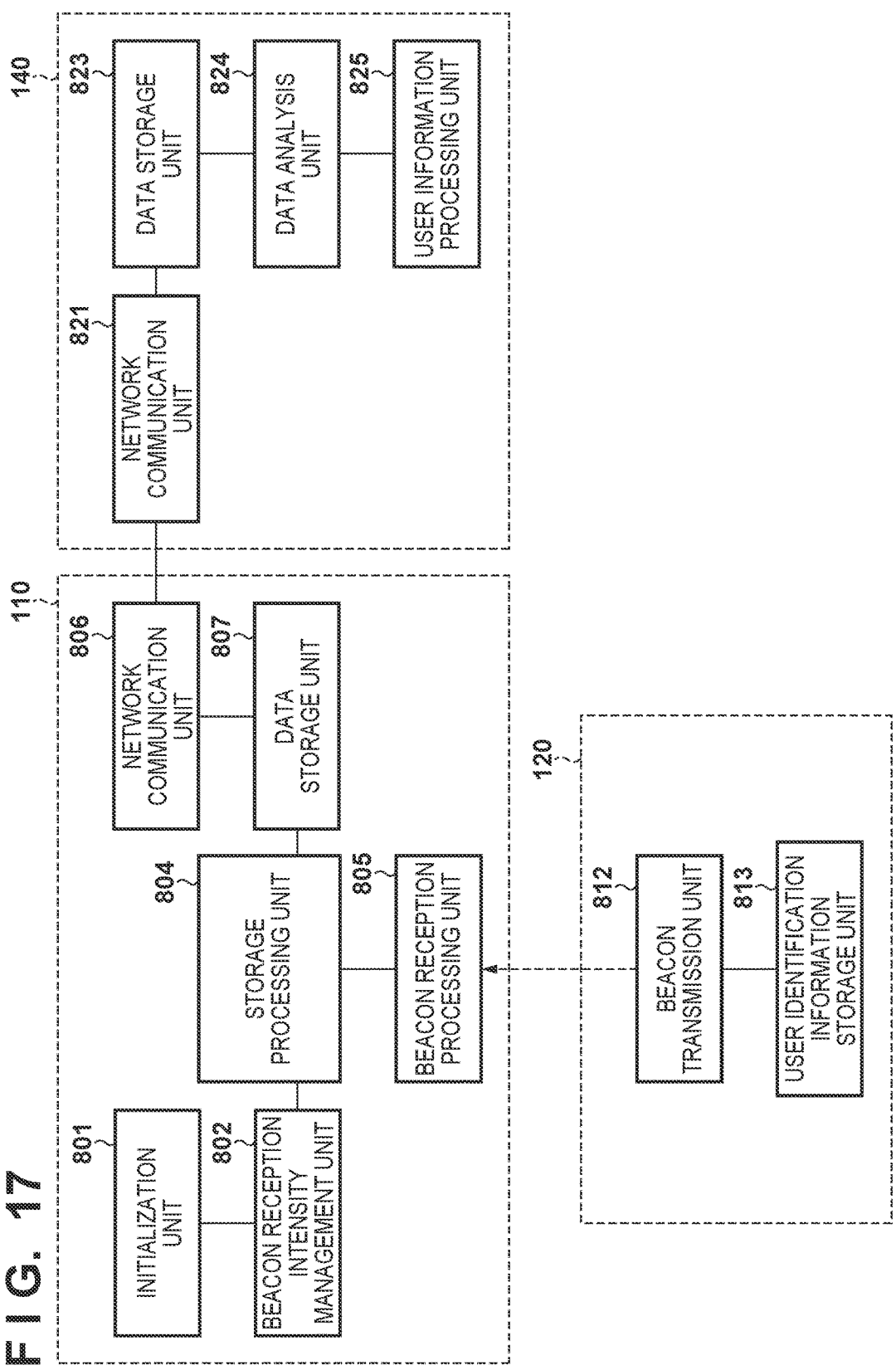
FIG. 17 is a block diagram showing the functional arrangements of devices.

FIG. 17 is a block diagram showing the functional arrangements of the devices included in the system 2000. The programs that implement the functions of software configurations shown in FIG. 17 are stored in the ROMs of the devices. The CPU of each device loads the programs to the ROM and executes them, thereby implementing these functions.

The digital device 110 includes an initialization unit 801, a beacon reception intensity management unit 802, a storage processing unit 804, a beacon reception processing unit 805, a network communication unit 806, and a data storage unit 807. The initialization unit 801 decides an operable range 501. If the user terminal 120 exists within the operable range 501, the initial setting unit 801 calculates the minimum intensity of the beacon received by the wireless device 111 and transfers it to the beacon reception intensity management unit 802. The beacon reception intensity management unit 802 holds a beacon minimum reception intensity table in which a change-of-state item 1101 and a beacon minimum reception intensity item 1102 are associated with each other.

FIG. 18 is a view showing the structure of data. More specifically, FIG. 18 shows data included in the beacon 712 from the user terminal 120 to the digital device 110. User identification information 951 is identification information unique to the user terminal 120 held by the user.

FIGS. 21A and 21B are views showing tables each of which associates changes of states with beacon minimum reception intensities. In particular, FIG. 21A shows an example of a beacon minimum reception intensity table in a case in which a single wireless device 111 exists. This table includes the change-of-state item 1101 and the beacon minimum reception intensity item 1102.

FIG. 21B shows an example of a beacon minimum reception intensity table in a case in which three wireless devices 111 exist. This table includes beacon minimum reception intensities as many as the number of wireless devices 111 (here, three wireless devices) and a combination condition item 1115. Here, an item 1112 of a wireless device A beacon minimum reception intensity, an item 1113 of a wireless device B beacon minimum reception intensity, and an item 1114 of a wireless device C beacon minimum reception intensity are included.

When an operation detection sensor group 220 or a change-of-state detection sensor group 225 detects a change of state of the digital device 110, triggered by this, the storage processing unit 804 executes processing of acquiring a log. The storage processing unit 804 causes the beacon reception processing unit 805 to receive the beacon 712 periodically transmitted from the user terminal 120 to search for the user terminal 120 held by a user in the neighborhood.

The beacon reception processing unit 805 acquires the user identification information 951, distance information 352, and the beacon reception intensity and transfers them to the storage processing unit 804. The storage processing unit 804 designates the item of a change of state, and acquires the beacon minimum reception intensity in the operable range 501 from the beacon reception intensity management unit 802. If the beacon reception intensity is higher than the beacon minimum reception intensity, it is found that the user terminal 120 is located inside the operable range 501. Whether the user terminal 120 is located inside or outside the operable range 501 is determined in this way. The determination result, the user identification information 951, and the distance information 352 are associated with the item of the change of state and saved in the data storage unit 807 as a log.

Examples of the log stored in an HDD 204 are shown in FIGS. 13 and 14 described above. When a predetermined number of logs are accumulated in the data storage unit 807, the network communication unit 806 transmits them to the server 140.

The user terminal 120 includes a beacon transmission unit 812 and a user identification information storage unit 813. The beacon transmission unit 812 acquires the user identification information 951 from the user identification information storage unit 813, and periodically transmits the beacon 712 including the user identification information 951.

The server 140 includes a network communication unit 821, a data storage unit 823, a data analysis unit 824, and a user information processing unit 825. The network communication unit 821 receives a log from the network communication unit 806 of the digital device 110, and saves it in the data storage unit 823. The network communication unit 821 can be connected to a plurality of digital devices 110. In this case, log data may be saved for each digital device 110, or logs each including digital device identification information 341 may be saved in a single table. An arbitrary saving format is usable. The data analysis unit 824 analyzes a log saved in the data storage unit 823. The data analysis unit 824 transfers the user identification information 951 to the user information processing unit 825, thereby acquiring information such as the name and post of the user.

<Operations of Devices>

Initialization for detecting the user terminal 120 when a change of state has occurred in the digital device 110 will be described next. First, initial parameters used to decide the operable range 501 that is the range to search for the user terminal 120 when a change of state has occurred are set in an NVRAM 216 in advance.

FIG. 4C is a view exemplarily showing the initial parameters set in the NVRAM 216 in advance. A distance 361 between an operation unit and the user terminal 120 and a predetermined number 362 of users who can simultaneously exist in the operable range of the digital device 110 are the same as in the first embodiment.

Figure 19:
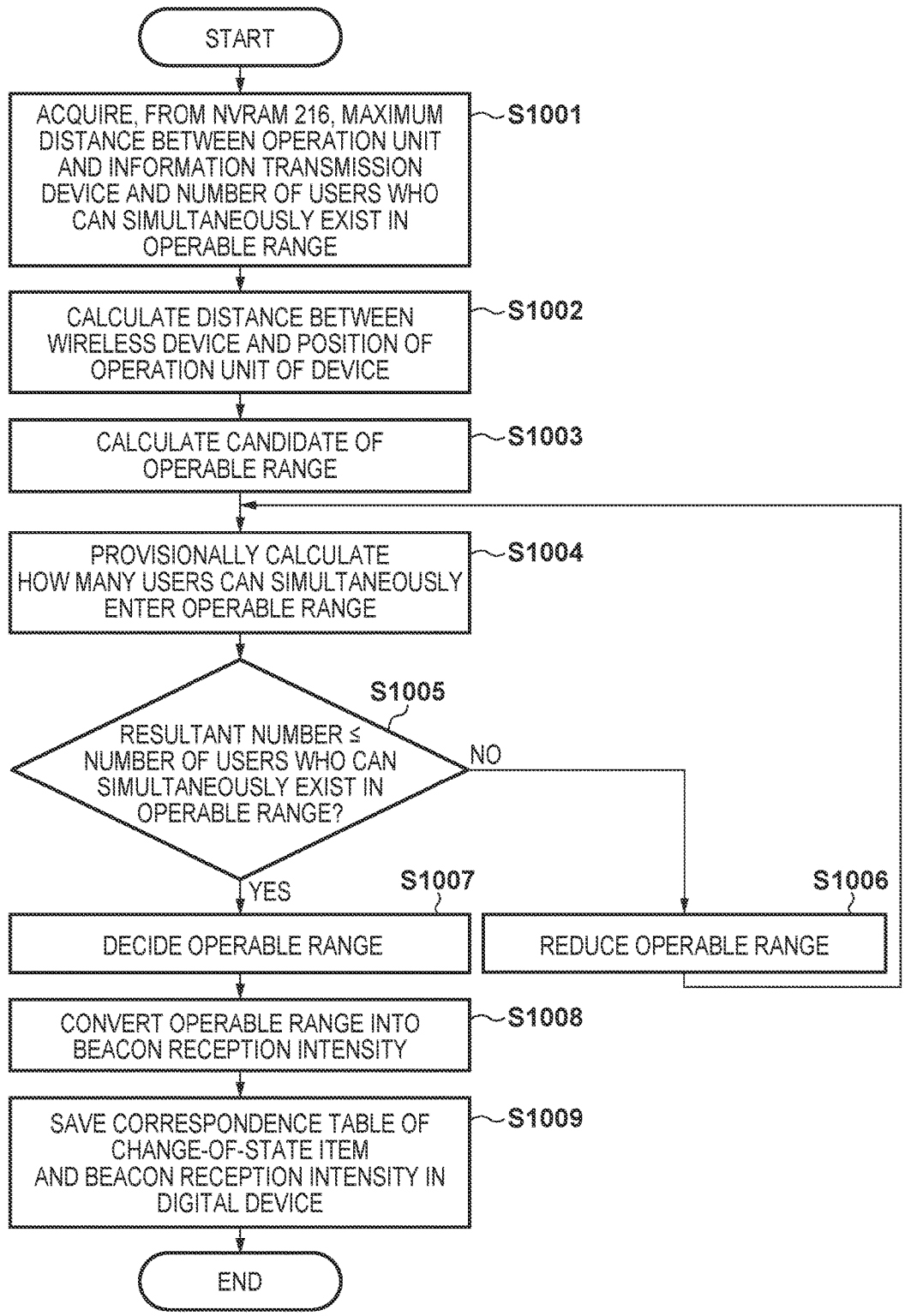
FIG. 19 is a flowchart showing initialization processing of a digital device.

FIG. 19 is a flowchart showing initialization processing of the digital device 110. That is, FIG. 19 shows the procedure of processing of the initial setting unit 801 performed to allow the digital device 110 to detect the user terminal 120 when a change of state has occurred in the digital device 110. The execution timing of the processing of the initial setting unit 801 is the same as in the first embodiment.

In step S1001, the initialization unit 801 acquires the maximum distance 361 between the operation unit and the user terminal and the predetermined number 362 of users who can simultaneously exist in the operable range, which are saved in the NVRAM 216 in advance. Steps S1002 to S1007 are the same as steps S402 to S407 of the first embodiment, and a description thereof will be omitted.

In step S1008, the initial setting unit 801 converts the operable range 501 into the reception intensity of the beacon 712. First, the initial setting unit 801 calculates an intensity with which the wireless device 111 receives the beacon 712 when the user terminal 120 exists at the boundary of the operable range 501. If the operable range 501 is changed by the item of a change of state, the item of a change of state and the beacon reception intensity change.

If the wireless device 111 can acquire a discrete distance such as "Immediate" corresponding to the closest area, "Near" corresponding to the second closest area, or "Far" corresponding to a far area based on the received beacon 712, a closest one of them may be used in place of the beacon reception intensity.

For example, if the operable range 501 is close to "Immediate", "Immediate" is designated as the beacon reception intensity. When an area where a plurality of wireless devices 111 simultaneously receive the beacon is set to the operable range 501, the reception intensity of the beacon 712 in a case in which the user terminal 120 is located farthest from the wireless device 111 within the operable range 501 is obtained for each wireless device 111.

In step S1009, the initialization unit 801 creates a beacon minimum reception intensity table in which change-of-state items and reception intensities of the beacon 712 by the wireless device are summarized, and saves it in an NVRAM 246.

FIG. 21A shows an example of the beacon minimum reception intensity table in a case in which one wireless device 111 exists. FIG. 21B shows an example of the beacon minimum reception intensity table in a case in which a plurality of wireless devices 111 exist. Note that FIGS. 21A and 21B show mere examples, and each table can use an arbitrary format. If the operable range 501 is not changed by the change-of-state item, a single beacon reception intensity value may be saved in the NVRAM 246.

Figure 20:
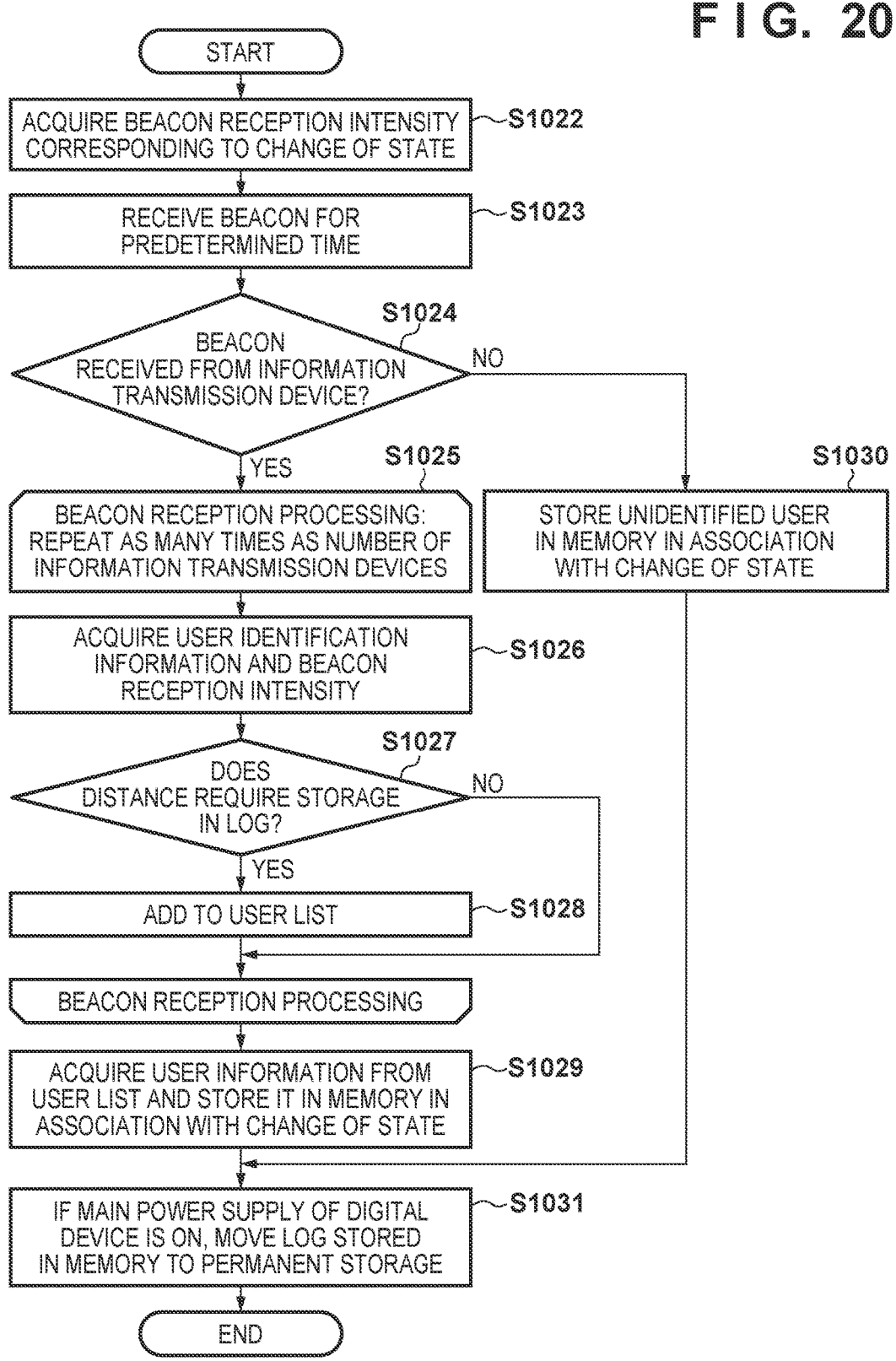
FIG. 20 is a flowchart showing log output processing of the digital device.

FIG. 20 is a flowchart showing log output processing of the digital device 110. That is, FIG. 20 shows the procedure of processing of the function of the digital device 110 when detecting the user terminal 120 existing on the periphery, acquiring the user identification information 951, and outputting a log in a case in which a change of state has occurred in the digital device 110.

The operation detection sensor group 220 or the change-of-state detection sensor group 225 detects a change of state that has occurred in the digital device 110. Triggered by this, the digital device 110 executes log output processing. Note that if the operation detection sensor group 220 or the change-of-state detection sensor group 225 does not detect a change of state that has occurred in the digital device 110, the log output processing is not executed. It is therefore unnecessary to always detect the position of the user terminal 120, and the power consumption can be small.

In step S1022, the digital device 110 acquires a beacon minimum reception intensity corresponding to the item of the change of state from the beacon minimum reception intensity table on the NVRAM 246. In step S1023, the digital device 110 receives the beacon 712 transmitted from the user terminal 120 held by a user in the neighborhood, and temporarily stores the information in a RAM 243. Note that the digital device 110 receives the beacon 712 for a predetermined time. This time is set to be much longer than the time interval of beacon transmission by the user terminal 120.

In step S1024, the digital device 110 determines whether the beacon 712 from the user terminal 120 is received. That is, if the digital device 110 is operated, the beacon 712 should be received from at least one user terminal 120. That is, if no beacon 712 can be received at all, the user who has done the operation is assumed to have no user terminal 120. Hence, in step S1030, the unidentified user is temporarily stored in the RAM 243 in association with the change of state.

If a response is received from at least one user terminal 120, the process enters a loop in step S1025. In step S1026, the user identification information 951 and the beacon reception intensity are acquired from the beacon 712. If the beacon reception intensity is higher than the beacon minimum reception intensity, it is found that the user terminal 120 is located inside the operable range 501. Whether the user terminal 120 is located inside or outside the operable range 501 is determined in this way. If the beacon reception intensity indicates the inside of the operable range 501 or the inside of a range to store, the user identification information 951 is added to the user list in step S1028. Upon determining that storage is unnecessary, the process skips step S1028.

In step S1031, the digital device 110 stores the distance information 352 and the time in the RAM 243.

In step S1029, the digital device 110 stores the distance information 352 and the time in the RAM 243 in association with at least one piece of user identification information in the user list.

In step S1031, if a main power supply 211 of the digital device 110 is ON, the digital device 110 moves the log stored in the RAM 243 to the HDD 204.

Note that if the main power supply 211 of the digital device 110 is OFF, the process skips step S1031, and the log is kept temporarily stored in the RAM 243. When this procedure is executed next, and the main power supply 211 of the digital device 110 is ON in step S1031, logs temporarily stored in the RAM 243 are moved to the HDD 204 at once.

Examples of the log stored in the HDD 204 are shown in FIGS. 13 and 14 described above.

A procedure of causing the user terminal 120 to transmit the beacon 712 to the digital device 110 will be described next. The user terminal 120 acquires the user identification information 951 from the user identification information storage unit 813 at a predetermined time interval, and transmits the beacon 712 including the user identification information 951.

A procedure of causing the digital device 110 to transmit a log to the server 140 is the same as in the first embodiment. A procedure of acquiring user information when analyzing a log accumulated in the server 140 is also the same as in the first embodiment.

As described above, according to the second embodiment, a log associated with a user can be acquired even for a change of state (for example, toner exchange, paper exchange, or error recovery) without a login operation to the digital device. Especially, when the position of a user relative to the digital device is specified using wireless communication, a more appropriate user concerning a change of state can be specified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-077144, filed Apr. 3, 2015, which is hereby incorporated by reference herein in its entirety.

What is claimed is:

1. An electronic device comprising,
a wireless communication unit;
a plurality of sensors;
a memory storing instructions, and
a processor executing the instructions causing the electronic device to
detect, via the wireless communication unit, wireless communication from a terminal existing on the periphery of the electronic device;
detect a change of state of the electronic device by using at least one of the plurality of sensors;
if the change of state is detected, and wireless communication that meets a predetermined condition corresponding to the detected change is detected, generate a first log that associates identification information corresponding to information included in the wireless communication with the detected change of state;
if the change of state is detected after a login operation to the electronic device is performed, generate a second log that associates identification information used to identify a user specified based on the login operation with the detected change of state; and
store the first log and the second log,
wherein the first log is generated independent of any login operation.

2. The device according to claim 1, wherein the first log generated according to the wireless communication includes, as the identification information, at least one of unique identification information of the terminal, unique identification information corresponding to wireless communication of the terminal, and identification information used to identify a user of the terminal, which are specified without the login operation to the electronic device.

3. The device according to claim 1, wherein if it can be determined based on the wireless communication that the terminal exists inside a predetermined operable range for the electronic device, the first log is generated according to the predetermined condition.

4. The device according to claim 3, wherein
the first log generated if it is determined based on first wireless communication from a first terminal that the first terminal exists inside the predetermined operable range is further associated with identification information corresponding to information included in second wireless communication from another device determined to exist outside the predetermined operable range.

5. The device according to claim 1, wherein if the first log and the second log which are associated with the same change of state exist, the first log and the second log in association with each other is stored or storage of one of the first log and the second log is inhibited.

6. The device according to claim 1, wherein detection of the change of state includes detection of an operation for the electronic device and detection of a change of internal state of the electronic device.

7. The device according to claim 1, wherein the wireless communication unit performs wireless communication complying with BLE (Bluetooth Low Energy).

8. A method of controlling an electronic device, including a plurality of sensors, comprising:
detecting, via the wireless communication unit, wireless communication from a terminal existing on the periphery of the electronic device;
detecting a change of state of the electronic device by using at least one of the plurality of sensors;
if the change of state is detected in the detecting of the change of state, and wireless communication that meets a predetermined condition corresponding to the detected change is detected, generating a first log that associates identification information corresponding to information included in the wireless communication with the detected change of state;
if the change of state is detected in the detecting of the change of state after a login operation to the electronic device is performed, generating a second log that associates identification information used to identify a user specified based on the login operation with the detected change of state; and
wherein the first log is generated independent of any login operation.

9. A non-transitory computer-readable recording medium storing a program that causes a computer to function as an electronic device, including a plurality of sensors, configured to:
detect, via the wireless communication unit, wireless communication from a terminal existing on the periphery of the electronic device;
detect a change of state of the electronic device by using at least one of the plurality of sensors;
if the change of state is detected, and wireless communication that meets a predetermined condition corresponding to the detected change is detected, generate a first log that associates identification information corresponding to information included in the wireless communication with the detected change of state;
if the change of state is detected after a login operation to the electronic device is performed, generate a second log that associates identification information used to identify a user specified based on the login operation with the detected change of state; and
store the first log and the second log,
wherein the first log is generated independent of any login operation.

* * * * *